United States Patent
Yanagihara et al.

(10) Patent No.: US 9,825,296 B2
(45) Date of Patent: Nov. 21, 2017

(54) SECONDARY BATTERY-USE ACTIVE MATERIAL, SECONDARY BATTERY-USE ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Sony Corporation, Tokyo (JP)

(72) Inventors: Asuki Yanagihara, Fukushima (JP); Tatsuya Saito, Fukushima (JP); Yosuke Hosoya, Fukushima (JP); Toshio Nishi, Fukushima (JP); Hideki Nakai, Fukushima (JP); Akinori Kita, Fukushima (JP)

(73) Assignee: Sony Corporation, Tokyo (JP)

( * ) Notice: Subject to any disclaimer, the term of this patent is extended or adjusted under 35 U.S.C. 154(b) by 253 days.

(21) Appl. No.: 14/773,661

(22) PCT Filed: Mar. 5, 2014

(86) PCT No.: PCT/JP2014/055573
§ 371 (c)(1),
(2) Date: Sep. 8, 2015

(87) PCT Pub. No.: WO2014/141960
PCT Pub. Date: Sep. 18, 2014

(65) Prior Publication Data
US 2016/0043398 A1    Feb. 11, 2016

(30) Foreign Application Priority Data
Mar. 12, 2013  (JP) .................................. 2013-048881

(51) Int. Cl.
*H01M 4/58* (2010.01)
*H01M 10/052* (2010.01)
(Continued)

(52) U.S. Cl.
CPC ....... *H01M 4/5825* (2013.01); *B60L 11/1851* (2013.01); *H01M 4/366* (2013.01);
(Continued)

(58) Field of Classification Search
CPC combination set(s) only.
See application file for complete search history.

(56) References Cited

U.S. PATENT DOCUMENTS

| 9,543,572 B2 * | 1/2017 | Toyoshima ........... H01M 4/131 |
| 2012/0015249 A1 | 1/2012 | Awano et al. |
| 2013/0216911 A1 | 8/2013 | Hosoya et al. |

FOREIGN PATENT DOCUMENTS

| JP | 2001-110414 | 4/2001 |
| JP | 2001110414 | 4/2001 |

(Continued)

OTHER PUBLICATIONS

International Search Report issued in connection with International Patent Application PCT/JP2014/055573, dated Jun. 10, 2014. (2 pages).

(Continued)

*Primary Examiner* — An Luu
(74) *Attorney, Agent, or Firm* — K&L Gates LLP

(57) ABSTRACT

A secondary battery includes: a cathode including an active material; an anode; and an electrolytic solution, and the active material includes a plurality of active material particles as primary particles and a carbon material. The active material particles contain a polyanion-based compound. The carbon material contains a first carbon material present on surfaces of the active material particles, and a second carbon material present between the active material particles provided with the first carbon material. A ratio B/A between a total carbon amount A and a surface carbon amount B of the active material satisfies 7<B/A<11.5. A ratio D/C between a (Continued)

specific surface area C of the active material, and an oil feed amount D of N-methyl-2-pyrrolidone satisfies $1.5 < D/C \leq 2$.

15 Claims, 7 Drawing Sheets

(51) Int. Cl.
    *H01M 10/0566* (2010.01)
    *H01M 4/583* (2010.01)
    *H01M 4/60* (2006.01)
    *H01M 10/04* (2006.01)
    *H01M 10/42* (2006.01)
    *B60L 11/18* (2006.01)
    *H01M 4/36* (2006.01)
    *H01M 4/587* (2010.01)
    *H01M 4/02* (2006.01)

(52) U.S. Cl.
    CPC ........... *H01M 4/583* (2013.01); *H01M 4/587* (2013.01); *H01M 4/602* (2013.01); *H01M 10/0431* (2013.01); *H01M 10/052* (2013.01); *H01M 10/0566* (2013.01); *H01M 10/42* (2013.01); *H01M 2004/021* (2013.01); *H01M 2004/028* (2013.01); *Y02E 60/122* (2013.01); *Y02T 10/7011* (2013.01); *Y10S 903/903* (2013.01)

(56) References Cited

FOREIGN PATENT DOCUMENTS

| | | |
|---|---|---|
| JP | 2001192208 | 7/2001 |
| JP | 2002-110162 | 4/2002 |
| JP | 2002313320 | 10/2002 |
| JP | 2003-036889 | 2/2003 |
| JP | 2003036850 | 2/2003 |
| JP | 2003036851 | 2/2003 |
| JP | 2003123764 | 4/2003 |
| JP | 2004-509058 | 3/2004 |
| JP | 2004-259470 | 9/2004 |
| JP | 2005268026 | 9/2005 |
| JP | 2007-214147 | 8/2007 |
| JP | 2008181714 | 8/2008 |
| JP | 2009004371 | 1/2009 |
| JP | 2009-263222 | 11/2009 |
| JP | 2010067365 | 3/2010 |
| JP | 2010-218884 | 9/2010 |
| JP | 2012056827 | 3/2012 |
| JP | 2012-104290 | 5/2012 |
| JP | 2012-234766 | 11/2012 |
| JP | 2013-048053 | 3/2013 |
| WO | 2009/075289 | 6/2009 |
| WO | WO2010064504 | 6/2010 |
| WO | 2013/005705 | 1/2013 |

OTHER PUBLICATIONS

Chinese Office Action (with English translation) dated Feb. 15, 2017 in corresponding Chinese application No. 2014800122488 (14 pages).

\* cited by examiner

SECONDARY BATTERY-USE ACTIVE MATERIAL, SECONDARY BATTERY-USE ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCES TO RELATED APPLICATIONS

The present application is a national stage of International Application No. PCT/JP2014/055573 filed on Mar. 5, 2014 and claims priority to Japanese Patent Application No. 2013-048881 filed on Mar. 12, 2013, the disclosure of which is incorporated herein by reference.

BACKGROUND

The present technology relates to a secondary battery-use active material including a plurality of active material particles as primary particles, to a secondary battery-use electrode and a secondary battery that use the secondary battery-use active material, and to a battery pack, an electric vehicle, an electric power storage system, an electric power tool, and an electronic apparatus that use the secondary battery.

Electronic apparatuses such as a mobile phone and a personal digital assistant (PDA) have been widely used, and it has been demanded to further reduce the sizes and the weights of the electronic apparatuses and to achieve their long life. Accordingly, as an electric power source for the electronic apparatuses, a battery, in particular, a small and light-weight secondary battery capable of providing high energy density has been developed.

In these days, it has been considered to apply such a secondary battery not only to the foregoing electronic apparatuses, but also to various applications. Examples of such other applications may include a battery pack attachably and detachably mounted on the electronic apparatuses or the like, an electric vehicle such as an electric automobile, an electric power storage system such as a home electric power server, and an electric power tool such as an electric drill, and various applications other than the foregoing applications are considered.

Secondary batteries utilizing various charge-discharge principles to obtain a battery capacity have been proposed. In particular, a secondary battery utilizing insertion and extraction of an electrode reactant or a secondary battery utilizing precipitation and dissolution of an electrode reactant has attracted attention, since such a secondary battery provides higher energy density than lead batteries, nickel-cadmium batteries, and the like.

The secondary battery includes a cathode, an anode, and an electrolytic solution. The cathode contains an active material (a cathode active material) participating in electrode reaction (charge-discharge reaction). As the cathode active material, a lithium compound (such as $LiCoO_2$) with a layered rock-salt crystal structure or a lithium compound (such as $LiMn_2O_4$) with a spinel crystal structure is widely used. In addition thereto, a polyanion-based compound, more specifically, a lithium compound (such as $LiFePO_4$) with an olivine crystal structure, or the like is used (For example, see Patent Literature 1).

Since the kind, composition, and the like of the cathode active material exert a large influence on battery characteristics such as a battery capacity and cycle characteristics, various studies have been made on the kind, composition, and the like of the cathode active material.

More specifically, in order to increase a charging-discharging capacity at the time of large-current charge and discharge, powder of a lithium iron phosphate-based material supports a conductive microparticle (for example, see Patent Literature 2). The lithium iron phosphate-based material is represented by $Li_zFe_{1-y}X_yO_4$ (where X is Mg or/and the like, $0 \leq y \leq 0.3$, and $0 < z \leq 1$), and an oxidation-reduction potential of the conductive microparticle is nobler than an oxidation-reduction potential of the lithium iron phosphate-based material.

In order to obtain superior input-output characteristics, lithium transition metal composite oxide particles are composited with carbon material particles (for example, see Patent Literature 3). The lithium transition metal composite oxide is represented by $LiMePO_4$ (where Me is a divalent transition metal).

In order to obtain a high discharging capacity, a lithium composite metal phosphate has a crystallite diameter of 35 nm or less (see Patent Literature 4). The lithium composite metal phosphate is represented by $Li_xA_yPO_4$ (where A is Cr or/and the like, $0 < x < 2$, and $0 < y \leq 1$).

In order to increase a charging-discharging capacity, lithium iron phosphate particles are manufactured by mixing an iron oxide or/and the like with a lithium raw material and a phosphorus raw material, adjusting a agglomerate diameter of the resultant mixture, and then firing the mixture in an inert gas atmosphere (for example, see Patent Literature 5). In the iron oxide or the like, a ratio of Na or/and the like to Fe is from 0.1 mol to 2 mol both inclusive, and a ratio of $Fe^{2+}$ to Fe is 40 mol % or less.

In order to obtain superior electron conductivity, a specific surface area of a complex of a compound represented by $Li_xFePO_4$ (where $0 < x \leq 1$) and a carbon material is 10.3 m$^2$/g or more (for example, see Patent Literature 6).

In order to improve input/output characteristics, a coating layer containing a carbon material is provided on a surface of a primary particle of a lithium complex oxoacid salt satisfying conditions such as a specific particle diameter distribution (for example, see Patent Literature 7). The lithium complex oxoacid salt is represented by $Li_eM3_fPO_4$ (where M3 is one or more of Group 2 to 15 elements, $0 < e \leq 1$, and $0 < f \leq 1$).

In order to achieve stable charge-discharge cycle performance, the oil feed amount of N-methyl-2-pyrrolidone with respect to a lithium phosphate compound coated with an electron conductive substance containing carbon is from 25 g/100 g to 35 g/100 g both inclusive (for example, see Patent Literature 8). The lithium phosphate compound is represented by $Li_xM1_{1-s}M2_sPO_4$ (where M1 is Fe or/and the like, M2 is one or more of Group 2 to 15 elements, $0 \leq x \leq 1.2$, and $0 < s \leq 1$).

In order to obtain superior electrical conductivity, particles having a core and a coating are synthesized in the presence of a carbon source (conductive carbon) (for example, see Patent Literature 9). The core contains a compound represented by $Li_xM_{1-y}M'_y(XO_4)_n$ (where M is a transition metal element, M' is $Mg^{2+}$ or/and the like, X is P or/and the like, $0 \leq x \leq 2$, $0 \leq y \leq 0.6$, and $1 \leq n \leq 1.5$).

CITATION LIST

Patent Literature

Patent Literature 1: Japanese Unexamined Patent Application Publication No. 2007-214147
Patent Literature 2: Japanese Unexamined Patent Application Publication No. 2001-110414

Patent Literature 3: Japanese Unexamined Patent Application Publication No. 2003-036889
Patent Literature 4: Japanese Unexamined Patent Application Publication No. 2004-259470
Patent Literature 5: Japanese Unexamined Patent Application Publication No. 2009-263222
Patent Literature 6: Japanese Unexamined Patent Application Publication No. 2002-110162
Patent Literature 7: Japanese Unexamined Patent Application Publication No. 2012-234766
Patent Literature 8: Japanese Unexamined Patent Application Publication No. 2012-104290
Patent Literature 9: Japanese Unexamined Patent Application Publication (Published Japanese Translation of PCT Application) No. 2004-509058

SUMMARY

In spite of various studies on the composition of the polyanion-based compound, and the like, there is still room for improvement in terms of obtaining sufficient battery characteristics. In particular, the polyanion-based compound typically has low electrical conductivity, and tends to elute a metal component at the time of charge at a high voltage; therefore, in order to obtain sufficient battery characteristics, it is necessary to overcome the foregoing tendencies.

Therefore, it is desirable to provide a secondary battery-use active material, a secondary battery-use electrode, a secondary battery, a battery pack, an electric vehicle, an electric power storage system, an electric power tool, and an electronic apparatus that are capable of obtaining superior battery characteristics.

A secondary battery-use active material according to an embodiment of the present technology includes: a plurality of active material particles as primary particles; and a carbon material. The active material particles contain a polyanion-based compound represented by the following formula (1), and the carbon material contains a first carbon material and a second carbon material, the first carbon material being present on surfaces of the active material particles, and the second carbon material being present between the active material particles provided with the first carbon material. A ratio B/A satisfies 7<B/A<11.5, where A is a total carbon amount of the active material measured by a total organic carbon analysis method (TOC), and B is a surface carbon amount of the active material measured by an X-ray photoelectron spectroscopy (XPS). A ratio D/C satisfies 1.5<D/C≤2, where C is a specific surface area of the active material measured by a BET single-point method, and D is an oil feed amount of N-methyl-2-pyrrolidone (NMP) with respect to the active material measured by an oil feed amount measurement method (JIS K5101-13-1).

$$Li_aM_bXO_cY_d \quad (1)$$

where M is one or more of transition metal elements, X is one or more of phosphorus (P), arsenic (As), silicon (Si), sulfur (S), vanadium (V), molybdenum (Mo), and tungsten (W), and Y is one or more of halogen elements, and a to d satisfy $0<a\leq 2$, $0<b\leq 1$, $0<c\leq 4$, and $0\leq d\leq 1$.

A secondary battery-use electrode according to an embodiment of the present technology includes an active material, and the active material has a configuration similar to that of the secondary battery-use active material according to the above-described embodiment of the present technology. Moreover, a secondary battery according to an embodiment of the present technology includes: a cathode including an active material; an anode; and an electrolyte solution, and the cathode has a configuration similar to that of the secondary battery-use electrode according to the above-described embodiment of the present technology. Further, a battery pack, an electric vehicle, an electric power storage system, an electric power tool, and an electronic apparatus according to embodiments of the present technology each include a secondary battery, and the secondary battery has a configuration similar to that of the secondary battery according to the above-described embodiment of the present technology.

The "active material particles" described here are primary particles, as described above. Therefore, the "first carbon material" is provided on surfaces of the primary particles, and the "second carbon material" is present between the primary particles.

The "total carbon amount A" is determined by a result of analysis on the active material using a total organic carbon meter (carbon analyzer), EMIA-811 manufactured by Horiba, Ltd. The "surface carbon amount B" is determined by a result of surface analysis on the active material using an X-ray photoelectron spectrometer, Quantera SXM manufactured by Ulvac-Phi, Inc. More specifically, the surface carbon amount B is determined by a ratio (element ratio) between intensity of an XPS spectrum of all elements and intensity of an XPS spectrum of carbon that are detected in proximity to the surface of the active material with use of a sample piece (active material) with a diameter of 100 mm.

The "specific surface area C" is determined by a result (nitrogen ($N_2$) absorption) of analysis on the active material using an automatic BET specific surface area measurement unit, Macsorb HM model-1208 manufactured by Mountech Co., Ltd. In this case, the weight of the active material is 0.5 g, deaeration temperature is 200° C., and deaeration time is 20 minutes. The "oil feed amount D" is determined by an N-methyl-2-pyrrolidone impregnation test on the active material. Details of a procedure and experimental conditions in this case are based on JIS standards (JIS K5101-13-1).

According to the secondary battery-use active material, the secondary battery-use electrode, or the secondary battery according to the embodiment of the present technology, the active material includes the plurality of active material particles (the polyanion-based compound) as the primary particles and the carbon material (the first carbon material and the second carbon material), and the ratio B/A and the ratio D/C satisfy the foregoing conditions. Therefore, superior battery characteristics are obtainable. Moreover, in the battery pack, the electric vehicle, the electric power storage system, the electric power tool, or the electronic apparatus according to the embodiment of the present technology, a similar effect is obtainable.

Additional features and advantages are described herein, and will be apparent from the following Detailed Description and the figures.

DETAILED DESCRIPTION

Some embodiments of the present technology will be described in detail below referring to the accompanying drawings. It is to be noted that description will be given in the following order.
1. Secondary Battery-Use Active Material
2. Application Examples of Secondary Battery-use Active Material
   2-1. Secondary Battery-Use Electrode and Secondary Battery (Lithium-ion Secondary Battery: Cylindrical-type)
   2-2. Secondary Battery-Use Electrode and Secondary Battery (Lithium-ion Secondary Battery: Laminated-film-type)
   2-3. Secondary Battery-Use Electrode and Secondary Battery (Lithium-metal Secondary Battery)
3. Applications of Secondary Battery
   3-1. Battery Pack
   3-2. Electric Vehicle
   3-3. Electric Power Storage System
   3-4. Electric Power Tool (1. Secondary Battery-Use Active Material)

A secondary battery-use active material (hereinafter simply referred to as "active material" as well) according to an embodiment of the present technology may be used, for example, for an electrode of a secondary battery. This active material may be used, for example, for a cathode or an anode.

[Configuration of Active Material]

Figure 1:
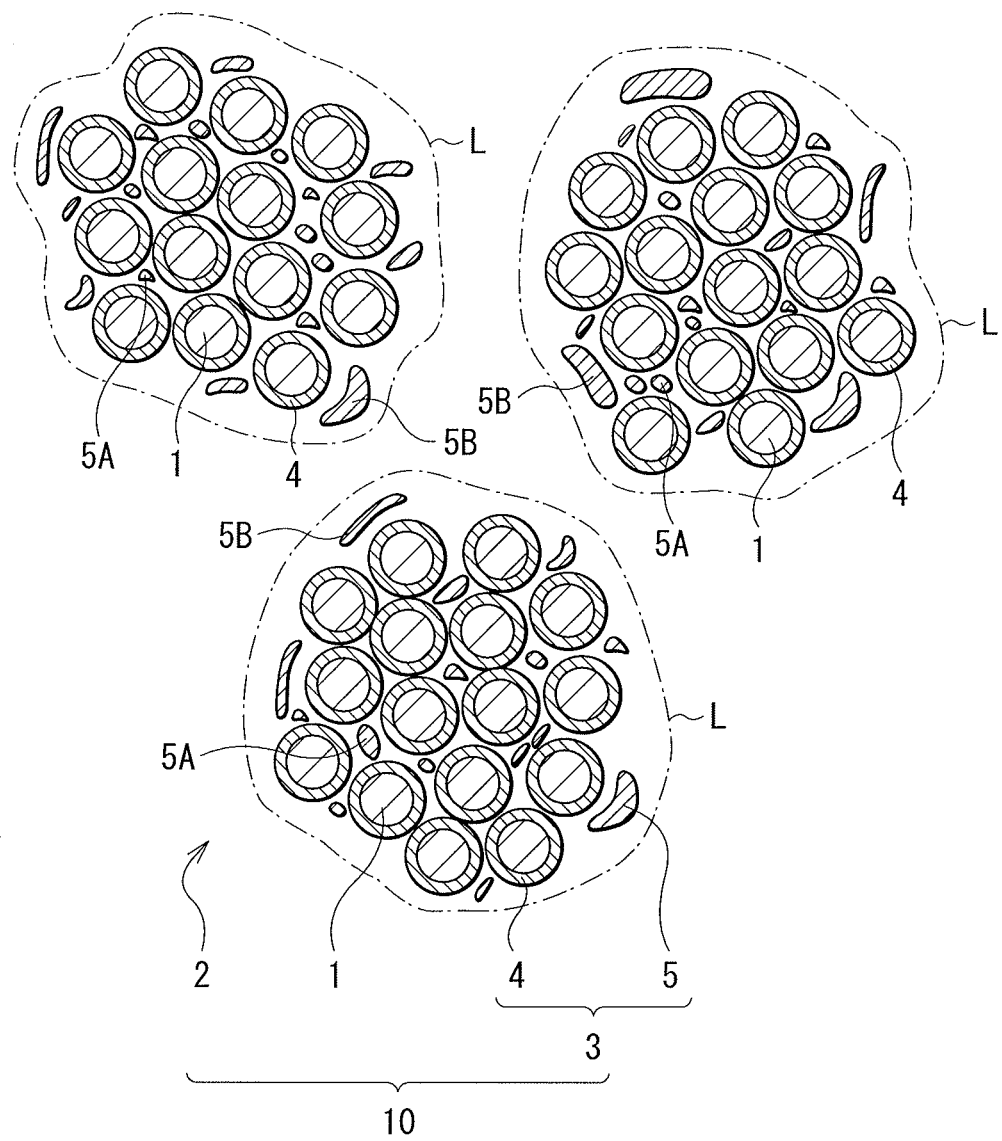
FIG. 1 is a cross-sectional view illustrating a configuration of a secondary battery-use active material according to an embodiment of the present technology.

FIG. 1 illustrates a cross-sectional configuration of an active material 10. This active material 10 may include a secondary particle 2 as an aggregate of a plurality of primary particles (active material particles 1) and a carbon material 3. In other words, the active material 10 is a composite of the plurality of active material particles 1 and the carbon material 3. Hereinafter, a structure in which the plurality of active material particles 1 and the carbon material 3 are composited is referred to as "composite structure".

It is to be noted that a line L illustrated in FIG. 1 indicates a region occupied by one active material 10. In other words, FIG. 1 illustrates three active materials 10.

[Active Material Particle]

The active material particle 1 contains one or more of polyanion-based compounds 1 represented by the following formula (1). The "polyanion-based compound" is a generic name for a compound containing a polyanion such as a phosphate ion or a silicate ion, and is capable of inserting and extracting lithium (a lithium ion). The active material particle 1 includes the polyanion-based compound, since thereby, an action potential of a secondary battery is improved by an inductive effect.

$$Li_a M_b X O_c Y_d \tag{1}$$

where M is one or more of transition metal elements, X is one or more of phosphorus (P), arsenic (As), silicon (Si), sulfur (S), vanadium (V), molybdenum (Mo), and tungsten (W), and Y is one or more of halogen elements, and a to d satisfy $0 < a \leq 2$, $0 < b \leq 1$, $0 < c \leq 4$, and $0 \leq d \leq 1$.

As can be seen from the ranges that the values of a to d are able to take on, the polyanion-based compound contains, as essential elements, lithium (Li), the transition metal element (M), the element (X) such as phosphorus, and oxygen (O). On the other hand, the polyanion-based compound may or may not contain a halogen element (Y).

The kind of M is not particularly limited, as long as M is one or more of Group 3 to 11 elements in the long form of the periodic table of the elements. In particular, M may be preferably one or more of iron (Fe), cobalt (Co), manganese (Mn), and nickel (Ni), and may more preferably contain Mn. One reason for this is that oxidation-reduction reaction (divalent/trivalent) of a transition metal stably and reversibly proceeds; therefore, a high oxidation-reduction potential is obtained.

The kind of X is not particularly limited, as long as X is one or more of the foregoing elements such as phosphorus. In particular, X may be preferably one or both of silicon (Si) and phosphorus (P), and may be more preferably P. One reason for this is that a $PO_4$ skeleton having a strong covalent bond is formed; therefore, high stability is obtained.

As described above, Y may not be contained as a constituent element in the polyanion-based compound; however, Y may be preferably contained in the polyanion-based compound. One reason for this is that structural stability of the active material 10 and the action potential of the secondary battery are improved. The kind of Y is not particularly limited, as long as Y is one or more of halogen elements, more specifically, one or more of Group 17 elements in the long form of the periodic table of the elements. The halogen element may be, for example, one or more of fluorine (F), chlorine (Cl), bromine (Br), and iodine (I), and in particular, the halogen element may be preferably F. One reason for this is that F has specifically high electronegativity; therefore, a higher effect is obtained.

Therefore, the polyanion-based compound represented by the formula (1) may be preferably represented by the following formula (2). One reason for this is that the usable amount of lithium is increased; therefore, a high battery capacity is obtained. Another reason for this is that the polyanion-based compound represented by the formula (2) is manufactured easily and stably. The polyanion-based compound is a compound (a phosphate compound) containing, as M in the formula (1), Mn and, if necessary, another transition metal element, and containing P as X.

$$LiMn_e Z_{1-e} PO_4 \tag{2}$$

where Z is one or more of Fe, Co, and Ni, and e satisfies $0 < e \leq 1$.

As can be seen from the range that the value of e is able to take on, while the polyanion-based compound described here contains Mn as an essential transition metal element, the polyanion-based compound may not contain the transition metal element (Z) other than Mn.

The kind of Z is not particularly limited, as long as Z is one or more of Fe, Co, and Ni; however, in particular, Z may be more preferably Fe. One reason for this is that crystal strain of Mn caused by electronic structural change at the time of oxidation-reduction reaction (divalent/trivalent) is eased. Another reason for this is that oxidation-reduction reaction (divalent/trivalent) of Fe itself occurs, and a higher battery capacity is thereby obtained.

Based on these conditions, the polyanion-based compound represented by the formula (2) may be more preferably represented by the following formula (3).

$$LiMn_fFe_{1-f}PO_4 \quad (3)$$

where f satisfies 0<f<1.

The value of f is not particularly limited, as long as the value of f satisfies 0<f<1; however, in particular, the value of f may preferably satisfy 0.5≤f≤0.9. One reason for this is that high energy density is obtained and oxidation-reduction reaction is stabilized; therefore, advantages thereof are compatible.

Specific examples of the polyanion-based compound may include $LiFePO_4$, $LiCoPO_4$, $LiMnPO_4$, $LiNiPO_4$, $LiMn_{0.5}Fe_{0.5}PO_4$, $LiMn_{0.6}Fe_{0.4}PO_4$, $LiMn_{0.7}Fe_{0.3}PO_4$, $LiMn_{0.8}Fe_{0.2}PO_4$, $LiMn_{0.9}Fe_{0.1}PO_4$, $Li_2FePO_4F$, and $Li_2FeSiO_4$, and may include a compound other than the foregoing compounds.

[Carbon Material]

The carbon material 3 contains a coating carbon material 4 as a first carbon material and a free carbon material 5 (5A) as a second carbon material. The coating carbon material 4 is present on a surface of the active material particle 1, and the free carbon material 5 (5A) is present between the active material particles 1 provided with the coating carbon material 4.

The coating carbon material 4 is provided on the surface of the active material particle 1 to cover at least a part of the surface of the active material particle 1. In other words, the entire surface of the active material particle 1 may be coated with the coating carbon material 4, or a part of the surface of the active material particle 1 may be coated with the coating material 4. In a case where a part of the surface of the active material particle 1 is coated with the coating carbon material 4, a plurality of coating carbon materials 4 may be present on the surface of the active material particle 1.

The coating carbon material 4 is provided on the surface of the active material particle 1 in order to prevent the surface of the high-reactive active material particle 1 from being exposed. Accordingly, decomposition reaction of an electrolytic solution or the like on the surface of the active material particle 1 is suppressed.

The free carbon material 5 (5A) is present in a gap between the active material particles 1 provided with the coating carbon material 4, since electrical conductivity between the active material particles 1 is thereby improved.

It is to be noted that the free carbon material 5 (5B) may be present in proximity to the surface of the active material particle 1 provided with the coating carbon material 4, more specifically in proximity to an outermost periphery of the secondary particle 2. The "outermost periphery of the secondary particle 2" refers to a region other than a region between the active material particles 1 (a region where the free carbon material 5A may be present) of a region in proximity to the surface of the active material particle 1. One reason for this is that electrical conductivity between the secondary particles 2 is improved.

In the active material 10, the plurality of active material particles 1 and the carbon material 3 (the coating carbon material 4 and the free carbon material 5) are mixed (composited) in such a manner. The composite structure of the active material 10 is a specific structure resulting from having already mixed a formation material (a raw material) of the active material particle 1 and a formation material (a carbon source material) of the carbon material 3 in a stage before formation (firing) of the active material particle 1. In other words, when the formation material of the active material particle 1 and the formation material of the carbon material 3 are fired together in a mixed state, the coating carbon material 4 is formed on the surface of the active material particle 1, and the free carbon material 5 is formed in a gap between the active material particles 1.

The composite structure of the active material 10 may be confirmed by observing a cross-section of the active material 10 with use of, for example, a scanning electron microscope (SEM). In particular, in a case where it is desired to confirm whether or not the plurality of active material particles 1 and the carbon material 3 are composited, it is only necessary to determine whether or not the free carbon material 5A is present in a gap between the active material particles 1. The presence of the free carbon material 5A is evidence that the active material 10 has the composite structure, and indicates a process sequence that the active material 10 is formed by the foregoing formation procedure.

[Ratio B/A and Ratio D/C]

Physical properties of the active material 10 having the composite structure satisfy the following two conditions.

As a first condition, a ratio B/A satisfies 7<B/A<11.5, where A is a total carbon amount of the active material 10 measured by a total organic carbon analysis method (TOC), and B is a surface carbon amount of the active material 10 measured by an X-ray photoelectron spectroscopy (XPS).

As describe above, the "total carbon amount A" is determined by a result of analysis on the active material 10 using a total organic carbon meter (carbon analyzer), EMIA-811 manufactured by Horiba, Ltd. Moreover, the "surface carbon amount B" is determined by a result of surface analysis on the active material 10 using an X-ray photoelectron spectrometer, Quantera SXM manufactured by Ulvac-Phi, Inc. More specifically, the surface carbon amount B is determined by a ratio (element ratio) between intensity of an XPS spectrum of all elements and intensity of an XPS spectrum of carbon that are detected in proximity to the surface of the active material 10 with use of a sample piece (active material) with a diameter of 100 mm.

The ratio B/A is an index indicating the amount of the carbon material 3 present in proximity to the surface of the active material 10 in the total amount of the carbon material 3 included in the active material 10. In other words, the ratio B/A indicates an extent to which the high-reactive active material particle 1 is coated with the carbon material 3.

The ratio B/A is within the foregoing range, since lithium ions are smoothly inserted and extracted while metal elusion in the active material 10 is suppressed. More specifically, when the ratio B/A is equal to or less than 7, the amount of the exposed surface of the active material particle 1 is too large; therefore, a metal component such as a transition metal (in particular, Mn) is easily eluded from the active material particle 1 to an electrolytic solution specifically at the time of charge at a high voltage. Accordingly, cycle characteristics as important characteristics of the secondary battery are degraded. On the other hand, when the ratio B/A is equal to or more than 11.5, the surface of the active material particle 1 is excessively coated with the carbon material 3, thereby increasing an activation barrier at the time of insertion and extraction of lithium ions; therefore, charge transfer resistance is excessively increased. Thus, rate characteristics as other important characteristics of the secondary battery are degraded.

As a second condition, a ratio D/C satisfies $1.5 < D/C \leq 2$, where C is a specific surface area of the active material 10 measured by a BET single-point method, and D is an oil feed amount of N-methyl-2-pyrrolidone (NMP) with respect to the active material 10 measured by an oil feed amount measurement method (JIS K5101-13-1).

As described above, the "specific surface area C" is determined by a result (nitrogen ($N_2$) absorption) of analysis on the active material 10 using an automatic BET specific surface area measurement unit, Macsorb HM model-1208 manufactured by Mountech Co., Ltd. In this case, the weight of the active material 10 is 0.5 g, deaeration temperature is 200° C., and deaeration time is 20 minutes. The "oil feed amount D" is determined by an NMP impregnation test on the active material 10. Details of a procedure and experimental conditions in this case are based on JIS standards (JIS K5101-13-1).

The ratio D/C is an index indicating the amount of an organic solvent (NMP) absorbed into the active material 10. In other words, the ratio D/C represents surface affinity of the active material 10 for an electrolytic solution containing the organic solvent.

The ratio D/C is within the foregoing range, since, as with the ratio B/A, lithium ions are smoothly inserted and extracted while metal elusion in the active material 10 is suppressed. More specifically, when the ratio D/C is equal to or less than 1.5, charge transfer resistance is excessively increased due to too low surface affinity of the active material 10 for the electrolyte solution; therefore, rate characteristics are degraded. On the other hand, when the ratio D/C is more than 2, a metal component is easily eluded from the active material particle 1 specifically at the time of charge at a high voltage due to too high surface affinity of the active material 10 for the electrolytic solution; therefore, cycle characteristics are degraded.

Therefore, when the ratio B/A and the ratio D/C satisfy the foregoing respective conditions, the coating amount of the carbon material 3 and affinity of the active material 10 for the electrolytic solution are made appropriate. Thus, the metal component is less likely to be eluted from the active material particle 1 to the electrolytic solution even at the time of charge at a high voltage, and the charge transfer resistance of the active material 10 is less likely to be increased.

In order to determine the foregoing ratio B/A and the foregoing ratio D/C, the secondary battery may be disassembled to take out the active material 10, and the total carbon amount A, the surface carbon amount B, the specific surface area C, and the oil feed amount D may be determined by the foregoing results of the analysis on the active material 10, and thereafter, the ratio B/A and the ratio D/C may be determined by calculation.

It is to be noted that physical properties of the active material 10 may be changed by charge-discharge reaction in a region where charge and discharge are substantially performed (a region where the cathode and the anode face each other) in the secondary battery. Therefore, even if the physical properties of the active material 10 in a secondary battery that has been already charged and discharged are determined, initial (in an uncharged/undischarged state) physical properties may not be accurately confirmed. However, in a case where an electrode is provided in a region where charge and discharge are not performed (an uncharged/undischarged region), the physical properties may be preferably determined in the uncharged/undischarged region. Since the physical properties in the uncharged/undischarged state are almost maintained in the uncharged/undischarged region, the physical properties are allowed to be confirmed afterwards irrespective of whether or not charge and discharge are performed. For example, in order to secure safety, an insulating protective tape may be bonded to a surface of an end of an anode (an anode active material layer) in the uncharged/undischarged region; therefore, the uncharged/undischarged region may be a region where charge and discharge are not allowed to be performed by the presence of the protective tape. Moreover, for example, since the anode is formed in a wider region than the cathode, the uncharged/undischarged region may be a region where the anode (the anode active material layer) does not face the cathode (a cathode active material layer).

[Method of Manufacturing Active Material]

The active material 10 may be manufactured by, for example, the following procedure.

First, a formation material (a raw material) of the active material particle 1 and a formation material (a carbon source material) of the carbon material 3 are prepared.

The raw material includes two or more materials serving as supply sources of respective constituent elements of the polyanion-based compound. Specific examples of the raw material may include lithium salt as a supply source of lithium and transition metal salt as a supply source of a transition metal element. The transition metal salt may contain only one transition metal as a constituent element, or may contain two or more transition metals as continent elements. The kind of salt is not particularly limited; however, examples of the salt may include one or more of an oxide, a hydroxide, a carbonate, a sulfate, a nitrate, a phosphate, a silicate, and the like.

The carbon source material may include one or more materials serving as formation sources of the carbon material 3. The kind of the carbon source material is not particularly limited, as long as the carbon source material contains carbon as a constituent element. More specifically, the carbon source material may be, for example, an organic material with a low molecular weight such as maltose, an organic material with a high molecular weight such as polyvinyl alcohol (PVA), or a material other than these organic materials.

Subsequently, the raw material and the carbon source material are mixed, and thereafter, the resultant mixture is dispersed in a solvent to obtain slurry. In this case, a mixture ratio of the raw material is so adjusted as to obtain a polyanion-based compound having a desired composition (as to allow a mole ratio of respective constituent elements to have a desired relationship). The kind of the solvent is not particularly limited, but may be pure water or the like.

Subsequently, the slurry is subjected to pulverization, and thereafter, the pulverized slurry is subjected to drying granulation to obtain precursor powder. In the pulverization, for example, a pulverizing apparatus such as a bead mill may be used, and in the drying granulation, for example, a spray dry method or the like may be used.

Finally, the precursor powder is fired to synthesize a plurality of active material particles 1. By this firing process, the secondary particle 2 as an aggregate of a plurality of active material particles 1 (primary particles) is formed, and the carbon material 3 (the coating carbon material 4 and the free carbon material 5) is formed by the carbon source material in the precursor powder. Therefore, the active material 10 with a structure in which the plurality of active material particles 1 and the carbon material 3 are composited is obtained.

In this process of manufacturing the active material 10, the ratio B/A and the ratio D/C are adjustable by changing conditions such as the kind of the raw material, the kind of the carbon source material, the mixing amount of the row material, the mixing amount of the carbon source material, the concentration of slurry, a bead diameter used for pulverization, and firing temperature.

[Method of Using Active Material]

It is to be noted that use conditions (charge-discharge conditions) of the secondary battery using the active material 10 are not particularly limited. In particular, an upper limit of the charging voltage may be preferably from 3.9 V to 4.4 V both inclusive, since a high battery capacity is obtained, and cycle characteristics as important characteristics of the secondary battery are secured. More specifically, when the upper limit is less than 3.9 V, oxidation reaction of the transition metal in the active material 10 is less likely to sufficiently proceed; therefore, a decline in energy density may be caused. On the other hand, when the upper limit is more than 4.4 V, oxidation reaction of a material other than the active material 10 is more likely to considerably proceed; therefore, a decline in cycle characteristics may be caused. Examples of the material other than the active material 10 may include, in addition to a binder and an electrical conductor, a separator and an electrolytic solution.

[Functions and Effects of Active Material]

In this active material, the plurality of active material particles 1 (the polyanion-based compound) as primary particles and the carbon material 3 (the coating carbon material 4 and the fee carbon material 5) are included, and the ratio B/A and the ratio B/C satisfy the foregoing respective conditions. In this case, as described above, both the coating amount of the carbon material 3 and affinity of the active material 10 for the electrolytic solution are made appropriate; therefore, balance therebetween is made appropriate. Thus, the metal component is less likely to be eluted from the active material 10 to the electrolytic solution even at the time of charge at a high voltage, and the charge transfer resistance of the active material 10 is less likely to be increased. Accordingly, superior rate characteristics are obtained in addition to superior cycle characteristics; therefore, the rate characteristics and the cycle characteristics are compatible.

In particular, when X in the formula (1) is P, a higher effect is allowed to be obtained. Moreover, when the polyanion-based compound is represented by the formula (2), and Z in the formula (2) is Fe, a higher effect is allowed to be obtained. It is to be noted that, in a case where Z in the formula (2) is Fe, as long as e satisfies $0.5 \leq e \leq 0.9$, a further higher effect is allowed to be obtained.

(2. Application Examples of Secondary Battery-Use Active Material)

Next, application examples of the foregoing secondary battery-use active material will be described below. This secondary battery-use active material may be used for a secondary battery-use electrode and a secondary battery in the following manner.

(2-1. Secondary Battery-Use Electrode and Secondary Battery (Lithium-Ion Secondary Battery: Cylindrical-Type))

Figure 2:
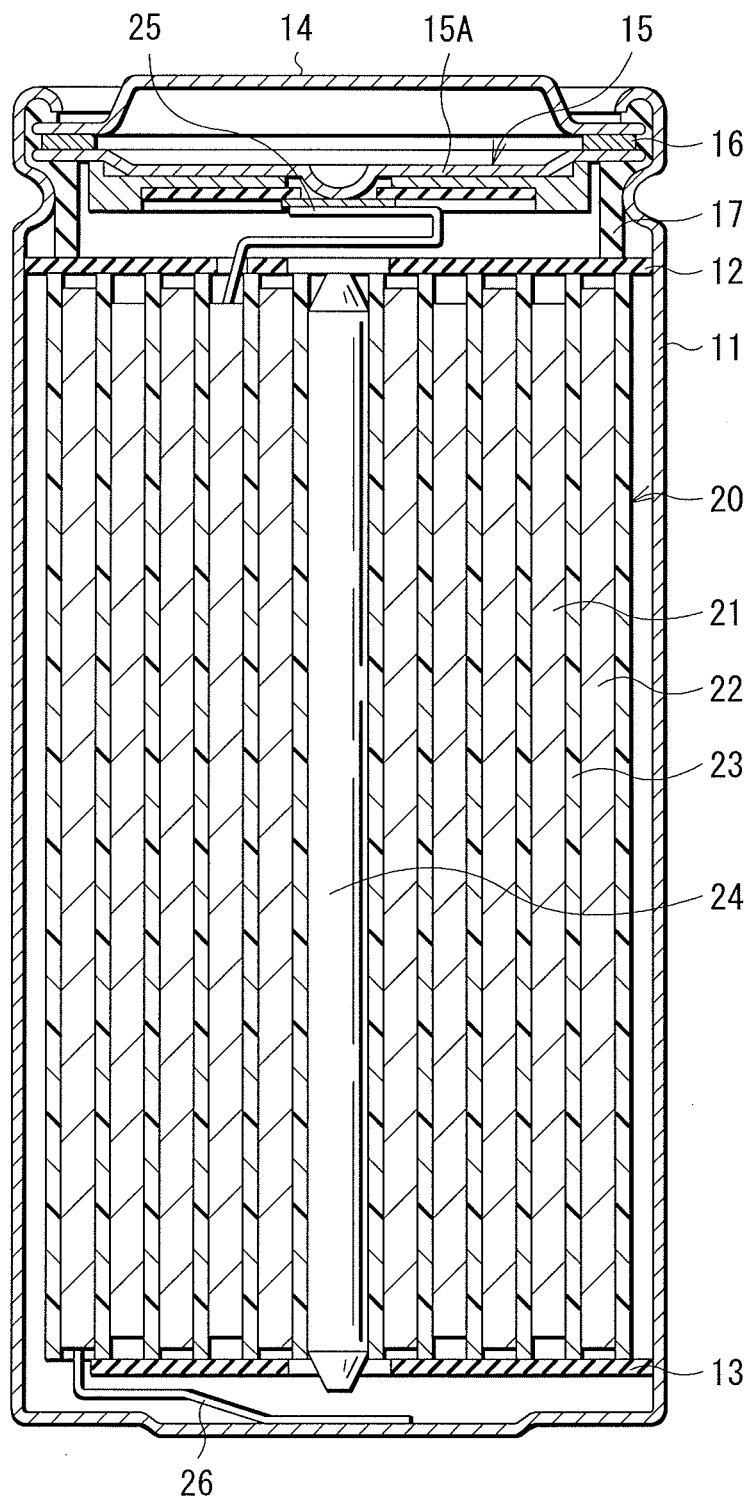
FIG. 2 is a cross-sectional view illustrating configurations of a secondary battery-use electrode and a secondary battery (cylindrical-type) that use the secondary battery-use active material according to the embodiment of the present technology.
Figure 3:
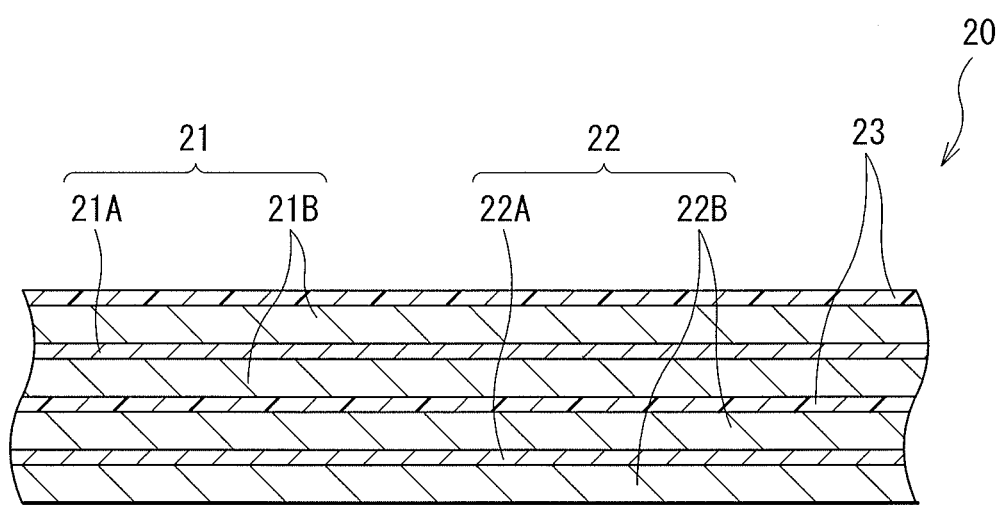
FIG. 3 is a cross-sectional view illustrating an enlarged part of a spirally wound electrode body illustrated in FIG. 2.

FIG. 2 and FIG. 3 illustrate cross-sectional configurations of a secondary battery. FIG. 3 illustrates an enlarged part of a spirally wound electrode body 20 illustrated in FIG. 2. In this example, the secondary battery-use electrode is applied to a cathode 21, for example.

[Whole Configuration of Secondary Battery]

The secondary battery described here is a lithium secondary battery (lithium ion secondary battery) in which a capacity of an anode 22 is obtained by insertion and extraction of lithium (lithium ions) as an electrode reactant, and is a so-called cylindrical-type battery structure.

For example, the secondary battery may contain a pair of insulating plates 12 and 13 and the spirally wound electrode body 20 inside a battery can 11 in the shape of a substantially-hollow cylinder. In the spirally wound electrode body 20, for example, the cathode 21 and the anode 22 are layered with a separator 23 in between and are spirally wound.

For example, the battery can 11 may have a hollow structure in which one end of the battery can 11 is closed and the other end of the battery can 11 is opened. The battery can 11 may be made of, for example, one or more of iron, aluminum, an alloy thereof, and the like. The surface of the battery can 11 may be plated with nickel or the like. The pair of insulating plates 12 and 13 is arranged to sandwich the spirally wound electrode body 20 in between, and to extend perpendicularly to the spirally wound periphery surface of the spirally wound electrode body 20.

At the open end of the battery can 11, a battery cover 14, a safety valve mechanism 15, and a positive temperature coefficient element (PTC element) 16 are attached by being caulked with a gasket 17. Therefore, the battery can 11 is hermetically sealed. The battery cover 14 may be made of, for example, a material similar to that of the battery can 11. The safety valve mechanism 15 and the PTC element 16 are provided inside the battery cover 14. The safety valve mechanism 15 is electrically connected to the battery cover 14 through the PTC element 16. In the safety valve mechanism 15, in the case where the internal pressure becomes a certain level or more by internal short circuit, external heating, or the like, a disk plate 15A inverts to disconnect electric connection between the battery cover 14 and the spirally wound electrode body 20. The PTC element 16 prevents abnormal heat generation resulting from a large current. As temperature rises, resistance of the PTC element 16 is increased accordingly. The gasket 17 may be made of, for example, an insulating material. The surface of the gasket 17 may be coated with asphalt.

In a hollow at the center of the spirally wound electrode body 20, for example, a center pin 24 may be inserted. However, the center pin 24 may not be provided. For example, a cathode lead 25 made of a conductive material such as aluminum may be connected to the cathode 21. For example, an anode lead 26 made of a conductive material such as nickel may be connected to the anode 22. For example, the cathode lead 25 may be attached to the safety valve mechanism 15 by welding, and may be electrically connected to the battery cover 14. For example, the anode lead 26 may be attached to the battery can 11 by welding, and may be electrically connected to the battery can 11.

[Cathode]

The cathode 21 has a cathode active material layer 21B on a single surface or both surfaces of a cathode current collector 21A. The cathode current collector 21A may be made of, for example, one or more of conductive materials such as aluminum, nickel, and stainless steel.

The cathode active material layer 21B contains, as cathode active materials, one or more of cathode materials capable of inserting and extracting lithium. The cathode material contains the foregoing secondary battery-use active material. However, the cathode active material layer 21B may further contain one or more materials such as a cathode binder and a cathode electric conductor.

It is to be noted that the cathode active material layer 21B may further contain other cathode material as long as the cathode active material layer 21B contains the foregoing secondary battery-use active material as a cathode material. Examples of such other cathode material may include one or more lithium-containing compounds (excluding the polyanion-based compound), since high energy density is thereby obtained. Examples of this lithium-containing compound may include a lithium transition metal composite oxide. The "lithium transition metal composite oxide" is an oxide containing lithium and one or more transition elements as constituent elements. In particular, the transition metal element may be preferably one or more of Co, Ni, Mn, Fe, and the like, since a higher voltage is thereby obtained. A formula thereof may be represented by $Li_xM1O_2$ and $Li_yM2PO_4$. In the formulas, each of M1 and M2 varies according to charge and discharge states, but may be, for example, $0.05 \leq x \leq 1.10$ and $0.05 \leq y \leq 1.10$.

Examples of the lithium transition metal composite oxide may include $LiCoO_2$, $LiNiO_2$, and a lithium-nickel-based composite oxide represented by the following formula (4), since thereby, a higher battery capacity is obtained, and superior cycle characteristics and the like are obtained.

$$LiNi_{1-z}M_zO_2 \quad (4)$$

where M is one or more of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb, and z satisfies $0.005 < z < 0.5$.

In addition thereto, the cathode material may be, for example, one or more of an oxide, a disulfide, a chalcogenide, a conductive polymer, and the like. Examples of the oxide may include titanium oxide, vanadium oxide, and manganese dioxide. Examples of the disulfide may include titanium disulfide and molybdenum sulfide. Examples of the chalcogenide may include niobium selenide. Examples of the conductive polymer may include sulfur, polyaniline, and polythiophene. However, the cathode material is not limited to any of the foregoing materials, and may be other material.

The cathode binder may contain one or more of synthetic rubbers, polymer materials, and the like. Examples of the synthetic rubber may include a styrene-butadiene-based rubber, a fluorine-based rubber, and ethylene propylene diene. Examples of the polymer material may include polyvinylidene fluoride and polyimide.

The cathode electric conductor may contain one or more of carbon materials and the like. Examples of the carbon materials may include graphite, carbon black, acetylene black, and Ketjen black. It is to be noted that the cathode electric conductor may be a metal material, a conductive polymer, or the like as long as the material has electric conductivity.

[Anode]

The anode 22 has an anode active material layer 22B on a single surface or both surfaces of an anode current collector 22A.

The anode current collector 22A may be made of, for example, one or more of conductive materials such as copper, nickel, and stainless steel. The surface of the anode current collector 22A may be preferably roughened. Thereby, due to a so-called anchor effect, adhesibility of the anode active material layer 22B with respect to the anode current collector 22A is improved. In this case, it is enough that the surface of the anode current collector 22A in a region opposed to the anode active material layer 22B is roughened at minimum. Examples of roughening methods may include a method of forming fine particles by utilizing electrolytic treatment. The electrolytic treatment is a method of forming the fine particles on the surface of the anode current collector 22A with the use of an electrolytic method in an electrolytic bath to provide concavity and convexity on the surface of the anode current collector 22A. A copper foil fabricated by an electrolytic method is generally called "electrolytic copper foil."

The anode active material layer 22B contains one or more of anode materials capable of inserting and extracting lithium as anode active materials. The anode active material layer 22B may further contain one or more other materials such as an anode binder and an anode electric conductor. Details of the anode binder and the anode electric conductor may be, for example, similar to those of the cathode binder and the cathode electric conductor. However, the charging capacity of the anode material may be preferably larger than the discharging capacity of the cathode 21 in order to prevent lithium metal from being unintentionally precipitated on the anode 22 in the middle of charge. In other words, the electrochemical equivalent of the anode material capable of inserting and extracting lithium may be preferably larger than the electrochemical equivalent of the cathode 21.

Examples of the anode material may include one or more of carbon materials. In the carbon material, its crystal structure change at the time of insertion and extraction of Li is extremely small, and therefore, the carbon material provides high energy density and superior cycle characteristics. Further, the carbon material functions as an anode electric conductor as well. Examples of the carbon material may include graphitizable carbon, non-graphitizable carbon, and graphite. However, the spacing of (002) plane in the non-graphitizable carbon may be preferably equal to or greater than 0.37 nm, and the spacing of (002) plane in graphite may be preferably equal to or smaller than 0.34 nm. More specifically, examples of the carbon material may include pyrolytic carbons, cokes, glassy carbon fiber, an organic polymer compound fired body, activated carbon, and carbon blacks. Examples of the cokes may include pitch coke, needle coke, and petroleum coke. The organic polymer compound fired body is obtained by firing (carbonizing) a polymer compound such as a phenol resin and a furan resin at appropriate temperature. In addition thereto, the carbon material may be low crystalline carbon or amorphous carbon heat-treated at temperature of about 1000° C. or less. It is to be noted that the shape of the carbon material may be any of a fibrous shape, a spherical shape, a granular shape, and a scale-like shape.

Further, the anode material may be, for example, a material (metal-based material) containing one or more of metal elements and metalloid elements as constituent elements, since higher energy density is thereby obtained. Such a metal-based material may be a simple substance, an alloy, or a compound, may be two or more thereof, or may have one or more phases thereof in part or all thereof. It is to be noted that "alloy" includes a material containing one or more metal elements and one or more metalloid elements, in addition to a material configured of two or more metal elements. Further, the "alloy" may contain a nonmetallic element. Examples of the structure thereof may include a solid solution, a eutectic crystal (eutectic mixture), an intermetallic compound, and a structure in which two or more thereof coexist.

Examples of the foregoing metal elements and the foregoing metalloid elements may include one or more of metal elements and metalloid elements capable of forming an alloy with lithium. Specific examples thereof may include Mg, B, Al, Ga, In, Si, Ge, Sn, Pb, Bi, Cd, Ag, Zn, Hf, Zr, Y, Pd, and Pt. In particular, Si or Sn or both may be preferable. One reason for this is that Si and Sn have a superior ability of inserting and extracting lithium ions, and therefore, provide high energy density.

A material containing Si or Sn or both as constituent elements may be any of a simple substance, an alloy, and a compound of Si, may be any of a simple substance, an alloy, and a compound of Sn, may be two or more thereof, or may have one or more phases thereof in part or all thereof. It is to be noted that the simple substance merely refers to a general simple substance (a small amount of impurity may be therein contained), and does not necessarily refer to a purity 100% simple substance.

The alloys of Si may contain, for example, one or more of elements such as Sn, Ni, Cu, Fe, Co, Mn, Zn, In, Ag, Ti, Ge, Bi, Sb, and Cr as constituent elements other than Si. The compounds of Si may contain, for example, one or more of C, O, and the like as constituent elements other than Si. It is to be noted that, for example, the compounds of Si may contain one or more of the elements described for the alloys of Si as constituent elements other than Si.

Examples of the alloys of Si and the compounds of Si may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), and LiSiO, where v in $SiO_v$ may be in the range of $0.2<v<1.4$.

The alloys of Sn may contain, for example, one or more of elements such as Si, Ni, Cu, Fe, Co, Mn, Zn, In, Ag, Ti, Ge, Bi, Sb, and Cr as constituent elements other than Sn. The compounds of Sn may contain, for example, one or more of elements such as C and O as constituent elements other than Sn. It is to be noted that the compounds of Sn may contain, for example, one or more of the elements described for the alloys of Sn as constituent elements other than Sn. Examples of the alloys of Sn and the compounds of Sn may include $SnO_w$ ($0<w\leq2$), $SnSiO_3$, LiSnO, and $Mg_2Sn$.

Further, as a material containing Sn as a constituent element, for example, a material containing a second constituent element and a third constituent element in addition to Sn as a first constituent element may be preferable. Examples of the second constituent element may include one or more of elements such as Co, Fe, Mg, Ti, V, Cr, Mn, Ni, Cu, Zn, Ga, Zr, Nb, Mo, Ag, In, Ce, Hf, Ta, W, Bi, and Si. Examples of the third constituent element may include one or more of elements such as B, C, Al, and P. In the case where the second constituent element and the third constituent element are contained, a high battery capacity, superior cycle characteristics, and the like are obtained.

In particular, a material (SnCoC-containing material) containing Sn, Co, and C as constituent elements may be preferable. The composition of the SnCoC-containing material may be, for example, as follows. That is, the C content may be from 9.9 mass % to 29.7 mass % both inclusive, and the ratio of Sn and Co contents (Co/(Sn+Co)) may be from 20 mass % to 70 mass % both inclusive, since high energy density is obtained in such a composition range.

It may be preferable that the SnCoC-containing material have a phase containing Sn, Co, and C. Such a phase may be preferably low-crystalline or amorphous. The phase is a reaction phase capable of reacting with lithium. By existence of the reaction phase, superior characteristics are obtained. The half bandwidth of the diffraction peak obtained by X-ray diffraction of the phase may be preferably equal to or greater than 1° based on diffraction angle of 2θ in the case where CuKα ray is used as a specific X ray, and the insertion rate is 1°/min. Thereby, lithium is more smoothly inserted and extracted, and reactivity with the electrolytic solution is decreased. It is to be noted that, in some cases, the SnCoC-containing material includes a phase containing a simple substance or part of the respective constituent elements in addition to the low-crystalline phase or the amorphous phase.

Whether or not the diffraction peak obtained by the X-ray diffraction corresponds to the reaction phase capable of reacting with lithium is allowed to be easily determined by comparison between X-ray diffraction charts before and after electrochemical reaction with lithium. For example, if the position of the diffraction peak after electrochemical reaction with lithium is changed from the position of the diffraction peak before the electrochemical reaction with lithium, the obtained diffraction peak corresponds to the reaction phase capable of reacting with lithium. In this case, for example, the diffraction peak of the low crystalline reaction phase or the amorphous reaction phase is seen in the range of 2θ=from 20° to 50° both inclusive. Such a reaction phase may have, for example, the foregoing respective constituent elements, and the low crystalline or amorphous structure thereof possibly results from existence of C mainly.

In the SnCoC-containing material, part or all of C as a constituent element may be preferably bound to a metal element or a metalloid element as other constituent element, since cohesion or crystallization of Sn and/or the like is suppressed accordingly. The binding state of elements is allowed to be checked by, for example, an X-ray photoelectron spectroscopy method (XPS). In a commercially available device, for example, as a soft X ray, Al-Kα ray, Mg-Kα ray, or the like may be used. In the case where part or all of C are bound to a metal element, a metalloid element, or the like, the peak of a synthetic wave of 1s orbit of C (C1s) is shown in a region lower than 284.5 eV. It is to be noted that energy calibration is made so that the peak of 4f orbit of Au atom (Au4f) is obtained in 84.0 eV. At this time, in general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Therefore, for example, analysis may be made with the use of commercially-available software to isolate both peaks from each other. In the waveform analysis, the position of the main peak existing on the lowest binding energy side is the energy standard (284.8 eV).

It is to be noted that the SnCoC-containing material is not limited to the material (SnCoC) formed of only Sn, Co, and C as constituent elements. In other words, the SnCoC-containing material may further contain, for example, one or more of Si, Fe, Ni, Cr, In, Nb, Ge, Ti, Mo, Al, P, Ga, Bi, and the like as constituent elements, in addition to Sn, Co, and C.

In addition to the SnCoC-containing material, a material containing Sn, Co, Fe, and C as constituent elements (SnCoFeC-containing material) may be also preferable. The composition of the SnCoFeC-containing material may be any composition. For example, the composition in which the Fe content is set small may be as follows. That is, the C content may be from 9.9 mass % to 29.7 mass % both inclusive, the Fe content may be from 0.3 mass % to 5.9 mass % both inclusive, and the ratio of contents of Sn and Co (Co/(Sn+Co)) may be from 30 mass % to 70 mass % both inclusive. Further, the composition in which the Fe content is set large is as follows. That is, the C content is from 11.9 mass % to 29.7 mass % both inclusive, the ratio of contents of Sn, Co, and Fe ((Co+Fe)/(Sn+Co+Fe)) is from 26.4 mass % to 48.5 mass % both inclusive, and the ratio of contents of Co and Fe (Co/(Co+Fe)) is from 9.9 mass % to 79.5 mass % both inclusive. In such a composition range, high energy density is obtained. It is to be noted that the physical properties (such as half bandwidth) of the SnCoFeC-containing material are similar to those of the foregoing SnCoC-containing material.

In addition thereto, the anode material may be, for example, one or more of a metal oxide, a polymer compound, and the like. Examples of the metal oxide may include iron oxide, ruthenium oxide, and molybdenum oxide. Examples of the polymer compound may include polyacetylene, polyaniline, and polypyrrole.

The anode active material layer 22B may be formed by, for example, one or more of a coating method, a vapor-phase method, a liquid-phase method, a spraying method, and a firing method (sintering method). The coating method may be a method in which, for example, after a particulate (powder) anode active material is mixed with an anode binder and/or the like, the mixture is dispersed in a solvent such as an organic solvent, and the anode current collector 22A is coated with the resultant. Examples of the vapor-phase method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase method may include an electrolytic plating method and an electroless plating method. The spraying method is a method in which an anode active material in a fused state or a semi-fused state is sprayed to the anode current collector 22A. The firing method may be, for example, a method in which after the anode current collector 22A is coated with a mixture dispersed in a solvent by a coating method, heat treatment is performed at temperature higher than the melting point of the anode binder and/or the like. Examples of the firing method may include an atmosphere firing method, a reactive firing method, and a hot press firing method.

In the secondary battery, as described above, in order to prevent lithium metal from being unintentionally precipitated on the anode 22 in the middle of charge, the electrochemical equivalent of the anode material capable of inserting and extracting lithium may be preferably larger than the electrochemical equivalent of the cathode. Further, in the case where the open circuit voltage (that is, a battery voltage) at the time of completely-charged state is equal to or greater than 4.25 V, the extraction amount of lithium ions per unit mass is larger than that in the case where the open circuit voltage is 4.20 V even if the same cathode active material is used. Therefore, amounts of the cathode active material and the anode active material are adjusted accordingly. Thereby, high energy density is obtainable.

[Separator]

The separator 23 separates the cathode 21 from the anode 22, and passes lithium ions while preventing current short circuit resulting from contact of both electrodes. The separator 23 may be, for example, a porous film made of a synthetic resin, ceramics, or the like. The separator 23 may be a laminated film in which two or more porous films are laminated. Examples of the synthetic resin may include polytetrafluoroethylene, polypropylene, and polyethylene.

In particular, the separator 23 may include, for example, a polymer compound layer provided on a single surface or both surfaces of the foregoing porous film (base material layer). One reason for this is that, thereby, adhesibility of the separator 23 with respect to the cathode 21 and the anode 22 is improved, and therefore, distortion of the spirally wound electrode body 20 is suppressed. Therefore, decomposition reaction of the electrolytic solution is suppressed, and liquid leakage of the electrolytic solution with which the base material layer is impregnated is suppressed. Accordingly, even if charge and discharge are repeated, the resistance is less likely to be increased, and battery swelling is suppressed.

The polymer compound layer may contain, for example, a polymer material such as polyvinylidene fluoride, since such a polymer material has superior physical strength and is electrochemically stable. However, the polymer material may be a polymer material other than polyvinylidene fluoride. The polymer compound layer may be formed as follows, for example. That is, after a solution in which the polymer material is dissolved is prepared, the base material layer is coated with the solution, and the resultant is subsequently dried. Alternatively, the base material layer may be soaked in the solution and may be subsequently dried.

[Electrolyte Solution]

The separator 23 is impregnated with an electrolytic solution as a liquid electrolyte. The electrolytic solution contains a solvent and an electrolyte salt, and may further contain other material such as an additive.

The solvent contains one or more of nonaqueous solvents such as an organic solvent. Examples of the nonaqueous solvents may include a cyclic ester carbonate, a chain ester carbonate, lactone, a chain carboxylic ester, and nitrile, since a superior battery capacity, superior cycle characteristics, superior conservation characteristics, and the like are thereby obtained. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methylpropyl carbonate. Examples of the lactone may include γ-butyrolactone and γ-valerolactone. Examples of the carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile.

In addition thereto, the nonaqueous solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, or dimethyl sulfoxide, since thereby, a similar advantage is obtained.

In particular, one or more of ethylene carbonate, propylene carbonate, dimethyl carbonate, diethyl carbonate, and ethyl methyl carbonate may be preferable, since a further superior battery capacity, further superior cycle characteristics, further superior conservation characteristics, and the like are thereby obtained. In this case, a combination of a high viscosity (high dielectric constant) solvent (for example, specific dielectric constant ∈≥30) such as ethylene carbonate and propylene carbonate and a low viscosity solvent (for example, viscosity≤1 mPa·s) such as dimethyl carbonate, ethylmethyl carbonate, and diethyl carbonate may be more preferable. One reason for this is that the dissociation property of the electrolyte salt and ion mobility are thereby improved.

In particular, the solvent may preferably contain one or more of an unsaturated cyclic ester carbonate, a halogenated ester carbonate, sultone (cyclic sulfonic ester), an acid anhydride, and the like. One reason for this is that, in this case, chemical stability of the electrolytic solution is improved. The unsaturated cyclic ester carbonate is a cyclic ester carbonate including one or more unsaturated carbon bonds (carbon-carbon double bonds). Examples of the unsaturated cyclic ester carbonate may include vinylene carbonate, vinylethylene carbonate, and methyleneethylene carbonate. The halogenated ester carbonate is a cyclic ester carbonate having one or more halogens as constituent elements or a chain ester carbonate having one or more halogens as constituent elements. Examples of the cyclic halogenated ester carbonate may include 4-fluoro-1,3-dioxolane-2-one and 4,5-difluoro-1,3-dioxolane-2-one. Examples of the chain halogenated ester carbonate may include fluoromethyl methyl carbonate, bis(fluoromethyl) carbonate, and difluoromethyl methyl carbonate. Examples of the sultone may include propane sultone and propene sultone. Examples of the acid anhydrides may include a succinic anhydride, an ethane disulfonic anhydride, and a sulfobenzoic anhydride. However, the solvent is not limited to the foregoing materials, and may be other material.

The electrolyte salt may contain, for example, one or more of salts such as a lithium salt. However, the electrolyte salt may contain a salt other than the lithium salt. Examples of the salt other than the lithium salt may include a light metal salt other than the lithium salt.

Examples of the lithium salts may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). Thereby, a superior battery capacity, superior cycle characteristics, superior conservation characteristics, and the like are obtained.

In particular, one or more of $LiPF_6$, $LiBF_4$, $LiClO_4$, and $LiAsF_6$ may be preferable, and $LiPF_6$ may be more preferable, since the internal resistance is thereby lowered, and therefore, a higher effect is obtained. However, the electrolyte salt is not limited to the foregoing materials, and may be other material.

Although the content of the electrolyte salt is not particularly limited, the content thereof may be preferably from 0.3 mol/kg to 3.0 mol/kg both inclusive with respect to the solvent, since high ion conductivity is obtained thereby.

[Operation of Secondary Battery]

The secondary battery may operate, for example, as follows. At the time of charge, lithium ions extracted from the cathode 21 are inserted in the anode 22 through the electrolytic solution. In contrast, at the time of discharge, lithium ions extracted from the anode 22 are inserted in the cathode 21 through the electrolytic solution.

[Method of Manufacturing Secondary Battery]

The secondary battery may be manufactured, for example, by the following procedure.

First, the cathode 21 is fabricated. In this case, the cathode active material (containing the foregoing secondary battery-use active material) is mixed with a cathode binder, a cathode electric conductor, and/or the like to prepare a cathode mixture. Subsequently, the cathode mixture is dispersed in an organic solvent or the like to obtain paste cathode mixture slurry. Subsequently, both surfaces of the cathode current collector 21A are coated with the cathode mixture slurry, which is dried to form the cathode active material layer 21B. Subsequently, the cathode active material layer 21B is compression-molded with the use of a roll pressing machine and/or the like. In this case, compression-molding may be performed while heating, or compression-molding may be repeated several times.

Further, the anode 22 is fabricated by a procedure similar to that of the cathode 21 described above. In this case, the anode active material is mixed with an anode binder, an anode electric conductor, and/or the like to prepare an anode mixture, which is subsequently dispersed in an organic solvent or the like to form paste anode mixture slurry. Subsequently, both surfaces of the anode current collector 22A are coated with the anode mixture slurry, which is dried to form the anode active material layer 22B. Thereafter, the anode active material layer 22B is compression-molded.

Finally, the secondary battery is assembled using the cathode 21 and the anode 22. The cathode lead 25 is attached to the cathode current collector 21A by a welding method and/or the like, and the anode lead 26 is attached to the anode current collector 22A by a welding method and/or the like. Subsequently, the cathode 21 and the anode 22 are layered with the separator 23 in between and are spirally wound, and the spirally wound electrode body 20 is thereby fabricated. Thereafter, the center pin 24 is inserted in the center of the spirally wound electrode body 20. Subsequently, the spirally wound electrode body 20 is sandwiched between the pair of insulating plates 12 and 13, and is contained in the battery can 11. In this case, the end tip of the cathode lead 25 is attached to the safety valve mechanism 15 by a welding method and/or the like, and the end tip of the anode lead 26 is attached to the battery can 11 by a welding method and/or the like. Subsequently, the electrolytic solution in which the electrolyte salt is dispersed in the solvent is injected into the battery can 11, and the separator 23 is impregnated with the electrolytic solution. Subsequently, at the open end of the battery can 11, the battery cover 14, the safety valve mechanism 15, and the PTC element 16 are fixed by being caulked with the gasket 17.

[Function and Effect of Secondary Battery]

According to the cylindrical-type secondary battery, the cathode active material layer 21B of the cathode 21 contains the foregoing secondary battery-use active material as a cathode active material. In this case, as described above, since cycle characteristics and rate characteristics are compatible, superior battery characteristics are obtainable. Other functions and other effects are similar to those of the secondary battery-use active material.

(2-2. Secondary Battery-Use Electrode and Secondary Battery (Lithium Ion Secondary Battery: Laminated-Film-Type))

Figure 4:
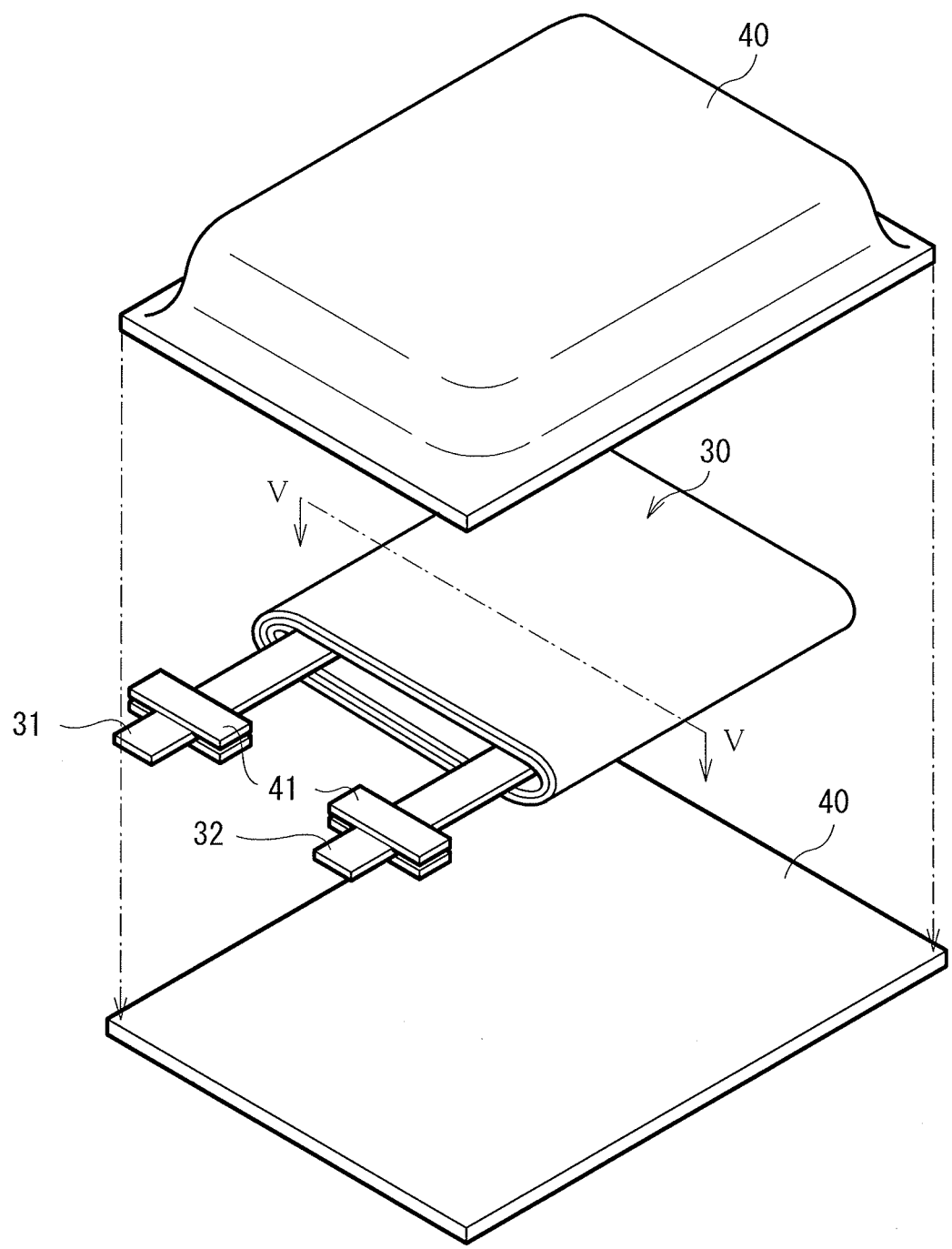
FIG. 4 is a perspective view illustrating configurations of another secondary battery-use electrode and another secondary battery (laminated-film-type) that use the secondary battery-use active material according to the embodiment of the present technology.
Figure 5:
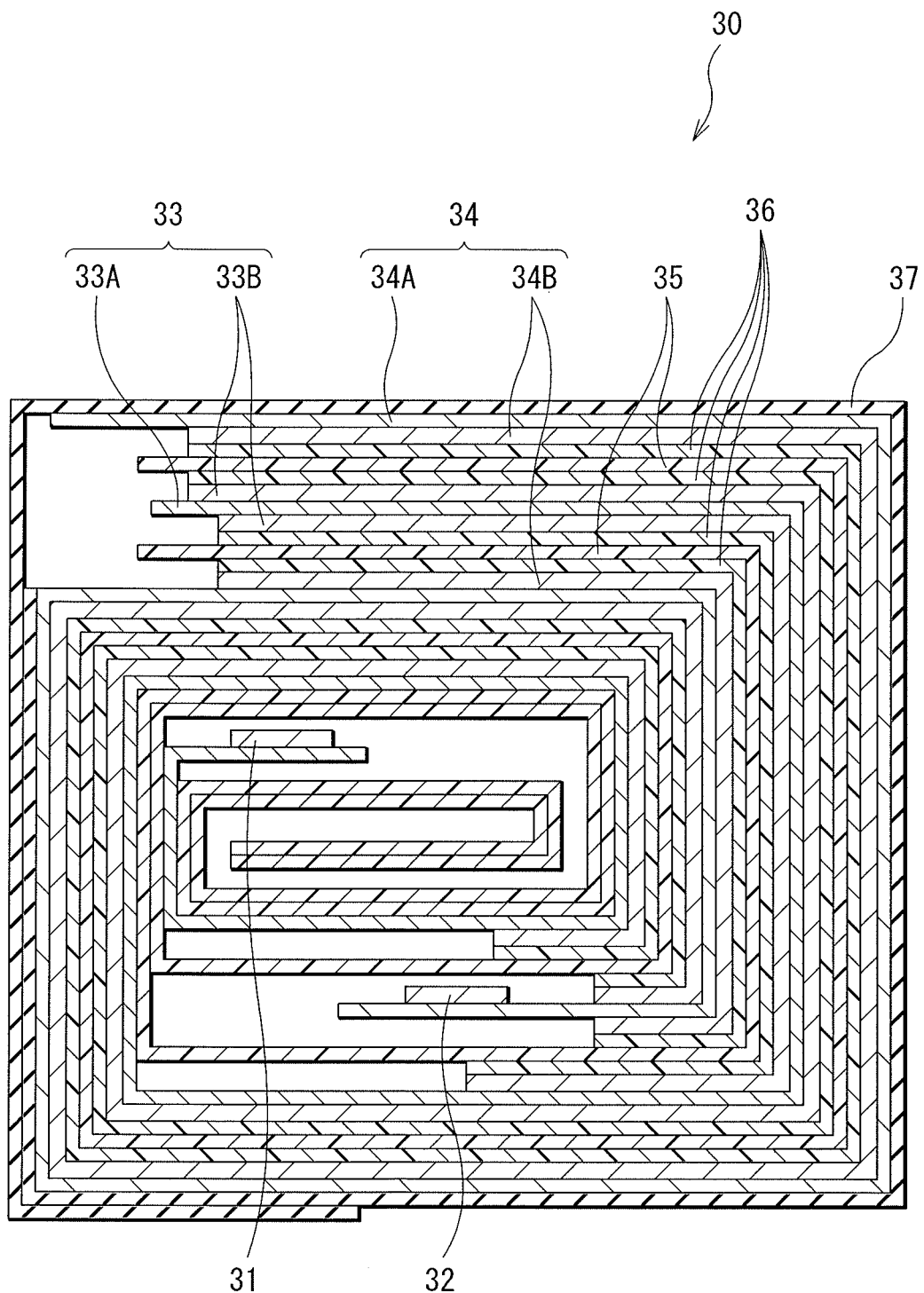
FIG. 5 is a cross-sectional view taken along a line V-V of a spirally wound electrode body illustrated in FIG. 4.

FIG. 4 illustrates an exploded perspective configuration of another secondary battery. FIG. 5 illustrates an enlarged cross-section taken along a line V-V of a spirally wound electrode body 30 illustrated in FIG. 4. However, FIG. 4 illustrates a state that the spirally wound electrode body 30 is separated from two outer package members 40. In the following description, the elements of the cylindrical-type secondary battery described above will be used as necessary.

[Whole Configuration of Secondary Battery]

The secondary battery described here is a so-called laminated-film-type lithium ion secondary battery. For example, the spirally wound electrode body 30 may be contained in a film-like outer package member 40. In the spirally wound electrode body 30, for example, a cathode 33 and an anode 34 may be layered with a separator 35 and an electrolyte layer 36 in between and may be spirally wound. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 may be, for example, led out from inside to outside of the outer package member 40 in the same direction. The cathode lead 31 may be made of, for example, one or more of conductive materials such as aluminum, and the anode lead 32 may be made of, for example, one or more of conductive materials such as copper, nickel, and stainless steel. These conductive materials may be in the shape of, for example, a thin plate or mesh.

The outer package member 40 may be a laminated film in which, for example, a fusion bonding layer, a metal layer, and a surface protective layer are laminated in this order. The outer package member 40 may be obtained by, for example, layering two laminated films so that the fusion bonding layers are opposed to the spirally wound electrode body 30, and subsequently fusion bonding outer edges of the respective fusion bonding layers. However, the two laminated films may be bonded to each other by an adhesive or the like. Examples of the fusion bonding layer may include a film made of polyethylene, polypropylene, or the like. Examples of the metal layer may include an aluminum foil. Examples of the surface protective layer may include a film made of nylon, polyethylene terephthalate, or the like.

In particular, the outer package member 40 may preferably be an aluminum laminated film in which a polyethylene film, an aluminum foil, and a nylon film are laminated in this order. However, the outer package member 40 may be a laminated film having other laminated structure, a polymer film such as polypropylene, or a metal film.

For example, an adhesive film 41 to prevent outside air intrusion may be inserted between the outer package member 40 and the cathode lead 31 and between the outer package member 40 and the anode lead 32. The adhesive film 41 is made of a material having adhesibility with respect to the cathode lead 31 and the anode lead 32. Examples of the material having adhesibility may include a polyolefin resin. More specific examples thereof may include polyethylene, polypropylene, modified polyethylene, and modified polypropylene.

The cathode 33 may have, for example, a cathode active material layer 33B on a single surface or both surfaces of a cathode current collector 33A. The anode 34 may have, for example, an anode active material layer 34B on a single surface or both surfaces of an anode current collector 34A. The configurations of the cathode current collector 33A, the cathode active material layer 33B, the anode current collector 34A, and the anode active material layer 34B are similar to the configurations of the cathode current collector 21A, the cathode active material layer 21B, the anode current collector 22A, and the anode active material layer 22B, respectively. In other words, the cathode active material layer 33B of the cathode 33 as a secondary battery-use electrode contains the foregoing secondary battery-use active material as a cathode active material. The configuration of the separator 35 is similar to the configuration of the separator 23.

In the electrolyte layer 36, an electrolytic solution is held by a polymer compound. The electrolyte layer 36 is a so-called gel electrolyte, since thereby, high ion conductivity (for example, 1 mS/cm or more at room temperature) is obtained and liquid leakage of the electrolytic solution is prevented. The electrolyte layer 36 may further contain other material such as an additive.

The polymer compound contains one or more of polymer materials. Examples of the polymer materials may include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethylmethacrylate, polyacrylic acid, polymethacrylic acid, styrene-butadiene rubber, nitrile-butadiene rubber, polystyrene, and polycarbonate. In addition thereto, the polymer material may be a copolymer. The copolymer may be, for example, a copolymer of vinylidene fluoride and hexafluoropylene. In particular, polyvinylidene fluoride or the copolymer of vinylidene fluoride and hexafluoropylene may be preferable, and polyvinylidene fluoride may be more preferable, since such a polymer compound is electrochemically stable.

For example, the composition of the electrolytic solution may be similar to the composition of the electrolytic solution of the cylindrical-type secondary battery. However, in the electrolyte layer 36 as a gel electrolyte, the solvent of the electrolytic solution refers to a wide concept including not only a liquid solvent but also a material having ion conductivity capable of dissociating the electrolyte salt. Therefore, in the case where a polymer compound having ion conductivity is used, the polymer compound is also included in the solvent.

It is to be noted that the electrolytic solution may be used as it is instead of the gel electrolyte layer 36. In this case, the separator 35 is impregnated with the electrolytic solution.

[Operation of Secondary Battery]

The secondary battery may operate, for example, as follows. At the time of charge, lithium ions extracted from the cathode 33 may be inserted in the anode 34 through the electrolyte layer 36. In contrast, at the time of discharge, lithium ions extracted from the anode 34 may be inserted in the cathode 33 through the electrolyte layer 36.

[Method of Manufacturing Secondary Battery]

The secondary battery including the gel electrolyte layer 36 may be manufactured, for example, by one of the following three procedures.

In the first procedure, the cathode 33 and the anode 34 are fabricated by a fabrication procedure similar to that of the cathode 21 and the anode 22. In this case, the cathode 33 is fabricated by forming the cathode active material layer 33B on both surfaces of the cathode current collector 33A, and the anode 34 is fabricated by forming the anode active material layer 34B on both surfaces of the anode current collector 34A. Subsequently, a precursor solution containing an electrolytic solution, a polymer compound, and a solvent such as an organic solvent is prepared. Thereafter, the cathode 33 and the anode 34 are coated with the precursor solution to form the gel electrolyte layer 36. Subsequently, the cathode lead 31 is attached to the cathode current collector 33A by a welding method and/or the like, and the anode lead 32 is attached to the anode current collector 34A by a welding method and/or the like. Subsequently, the cathode 33 and the anode 34 are layered with the separator 35 in between and are spirally wound to fabricate the spirally wound electrode body 30. Thereafter, the protective tape 37 is adhered to the outermost periphery thereof. Subsequently, after the spirally wound electrode body 30 is sandwiched between two pieces of film-like outer package members 40, the outer edges of the outer package members 40 are bonded by a thermal fusion bonding method and/or the like to enclose the spirally wound electrode body 30 into the outer package members 40. In this case, the adhesive films 41 are inserted between the cathode lead 31 and the outer package member 40 and between the anode lead 32 and the outer package member 40.

In the second procedure, the cathode lead 31 is attached to the cathode 33, and the anode lead 32 is attached to the anode 34. Subsequently, the cathode 33 and the anode 34 are layered with the separator 35 in between and are spirally wound to fabricate a spirally wound body as a precursor of the spirally wound electrode body 30. Thereafter, the protective tape 37 is adhered to the outermost periphery thereof. Subsequently, after the spirally wound body is sandwiched between two pieces of the film-like outer package members 40, the outer edges other than one side of the outer package members 40 are bonded by a thermal fusion bonding method and/or the like, and the spirally wound body is contained in the pouch-like outer package member 40. Subsequently, an electrolytic solution, a monomer as a raw material for the polymer compound, a polymerization initiator, and other materials such as a polymerization inhibitor are mixed to prepare a composition for electrolyte. Subsequently, the composition for electrolyte is injected into the pouch-like outer package member 40. Thereafter, the outer package member 40 is hermetically sealed by a thermal fusion bonding method and/or the like. Subsequently, the monomer is thermally polymerized, and thereby, a polymer compound is formed. As a result, the polymer compound is impregnated with the electrolytic solution, the polymer compound is gelated, and accordingly, the electrolyte layer 36 is formed.

In the third procedure, the spirally wound body is fabricated and contained in the pouch-like outer package member 40 in a manner similar to that of the foregoing second procedure, except that the separator 35 with both surfaces coated with a polymer compound is used. Examples of the polymer compound with which the separator 35 is coated may include a polymer (a homopolymer, a copolymer, or a multicomponent copolymer) containing vinylidene fluoride as a component. Specific examples of the homopolymer may include polyvinylidene fluoride. Examples of the copolymer may include a binary copolymer containing vinylidene fluoride and hexafluoro propylene as components. Examples of the multicomponent copolymer may include a ternary copolymer containing vinylidene fluoride, hexafluoro propylene, and chlorotrifluoroethylene as components. It is to be noted that, in addition to the polymer containing vinylidene fluoride as a component, other one or more polymer compounds may be used. Subsequently, an electrolytic solution is prepared and injected into the outer package member 40. Thereafter, the opening of the outer package member 40 is hermetically sealed by a thermal fusion bonding method and/or the like. Subsequently, the resultant is heated while a weight is applied to the outer package member 40, and the separator 35 is adhered to the cathode 33 and the anode 34 with the polymer compound in between. As a result, the polymer compound is impregnated with the electrolytic solution, the polymer compound is gelated, and accordingly, the electrolyte layer 36 is formed.

In the third procedure, swelling of the secondary battery is suppressed more than in the first procedure. Further, in the third procedure, the monomer as a raw material of the polymer compound, the solvent, and the like are less likely to be left in the electrolyte layer 36 compared to in the second procedure. Therefore, the formation step of the polymer compound is favorably controlled. Therefore, sufficient adhesibility is obtained between the cathode 33, the anode 34, and the separator 35, and the electrolyte layer 36.

[Function and Effect of Secondary Battery]

According to the laminated-film-type secondary battery, since the cathode active material layer 33B of the cathode 33 contains the foregoing secondary battery-use active material as a cathode active material. Therefore, superior battery characteristics are achievable for a reason similar to that of the cylindrical-type secondary battery. Other functions and other effects are similar to those of the cylindrical-type secondary battery.

(2-3. Secondary Battery-Use Electrode and Secondary Battery (Lithium-Metal Secondary Battery))

A secondary battery described here is a lithium secondary battery (lithium metal secondary battery) in which the capacity of the anode 22 is obtained by precipitation and dissolution of lithium metal. The secondary battery has a configuration similar to that of the foregoing cylindrical-type lithium ion secondary battery, except that the anode active material layer 22B is formed of the lithium metal, and is manufactured by a procedure similar to that of the cylindrical-type lithium ion secondary battery.

In the secondary battery, the lithium metal is used as an anode active material, and thereby, high energy density is obtainable. The anode active material layer 22B may exist at the time of assembling, or the anode active material layer 22B does not necessarily exist at the time of assembling and may be formed of the lithium metal precipitated at the time of charge. Further, the anode active material layer 22B may be used as a current collector, and thereby, the anode current collector 22A may be omitted.

The secondary battery may operate, for example, as follows. At the time of charge, lithium ions are discharged from the cathode 21, and are precipitated as the lithium metal on the surface of the anode current collector 22A through the electrolytic solution. In contrast, at the time of discharge, the lithium metal is eluded as lithium ions from the anode active material layer 22B, and is inserted in the cathode 21 through the electrolytic solution.

According to the lithium metal secondary battery, since the foregoing secondary battery-use active material is contained as a cathode active material, superior battery characteristics are obtainable for a reason similar to that of the lithium ion secondary battery. Other functions and other effects are similar to those of the lithium ion secondary battery. It is to be noted that the secondary battery described here is not limited to the cylindrical-type secondary battery, and may be a laminated-film-type secondary battery. Even in this case, a similar effect is obtainable.

(3. Applications of Secondary Battery)

Next, a description will be given of application examples of the foregoing secondary battery.

Applications of the secondary battery are not particularly limited as long as the secondary battery is applied to a machine, a device, an instrument, an apparatus, a system (collective entity of a plurality of devices and the like), or the like that is allowed to use the secondary battery as a driving electric power source, an electric power storage source for electric power storage, or the like. The secondary battery used as an electric power source may be a main electric power source (electric power source used preferentially), or may be an auxiliary electric power source (electric power source used instead of a main electric power source or used being switched from the main electric power source). In the case where the secondary batter is utilized as an auxiliary electric power source, the main electric power source type is not limited to the secondary battery.

Examples of applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a personal digital assistant. Further examples thereof may include a mobile lifestyle electric appliance such as an electric shaver; a memory device such as a backup electric power source and a memory card; an electric power tool such as an electric drill and an electric saw; a battery pack used as a removable and replaceable electric power source of a notebook personal computer or the like; a medical electronic apparatus such as a pacemaker and a hearing aid; an electric vehicle such as an electric automobile (including a hybrid automobile); and an electric power storage system such as a home battery system for storing electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, or the like. One reason for this is that, in these applications, since superior battery characteristics are demanded, performance is effectively improved with the use of the secondary battery according to the embodiment of the present technology. It is to be noted that the battery pack is an electric power source using a secondary battery, and is a so-called assembled battery or the like. The electric vehicle is a vehicle that works (runs) with the use of a secondary battery as a driving electric power source. As described above, the electric vehicle may be an automobile (such as a hybrid automobile) including a drive source other than a secondary battery. The electric power storage system is a system using a secondary battery as an electric power storage source. For example, in a home electric power storage system, electric power is stored in the secondary battery as an electric power storage source, and therefore, home electric products and the like become usable with the use of the electric power. The electric power tool is a tool in which a movable section (such as a drill) is moved with the use of a secondary battery as a driving electric power source. The electronic apparatus is an apparatus executing various functions with the use of a secondary battery as a driving electric power source (electric power supply source).

A description will be specifically given of some application examples of the secondary battery. It is to be noted that the configurations of the respective application examples explained below are merely examples, and may be changed as appropriate.

(3-1. Battery Pack)

Figure 6:
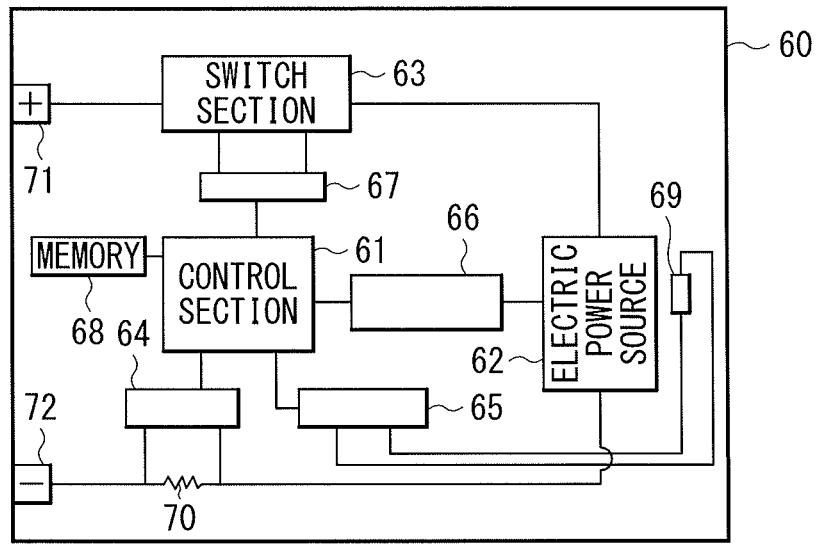
FIG. 6 is a block diagram illustrating a configuration of an application example (a battery pack) of the secondary battery.

FIG. 6 illustrates a block configuration of a battery pack. For example, the battery pack may include a control section 61, an electric power source 62, a switch section 63, a current measurement section 64, a temperature detection section 65, a voltage detection section 66, a switch control section 67, a memory 68, a temperature detection element 69, a current detection resistance 70, a cathode terminal 71, and an anode terminal 72 in a housing 60 made of a plastic material and/or the like.

The control section 61 controls operations of the whole battery pack (including a usage state of the electric power source 62), and may include, for example, a central processing unit (CPU) and/or the like. The electric power source 62 includes one or more secondary batteries (not illustrated). The electric power source 62 may be, for example, an assembled battery including two or more secondary batteries. Connection type of the secondary batteries may be a series-connected type, may be a parallel-connected type, or may be a mixed type thereof. As an example, the electric power source 62 may include six secondary batteries connected in a manner of dual-parallel and three-series.

The switch section 63 switches the usage state of the electric power source 62 (whether or not the electric power source 62 is connectable to an external device) according to an instruction of the control section 61. The switch section 63 may include, for example, a charge control switch, a discharge control switch, a charging diode, a discharging diode, and the like (not illustrated). The charge control switch and the discharge control switch may each be, for example, a semiconductor switch such as a field-effect transistor (MOSFET) using a metal oxide semiconductor.

The current measurement section 64 measures a current with the use of the current detection resistance 70, and outputs the measurement result to the control section 61. The temperature detection section 65 measures temperature with the use of the temperature detection element 69, and outputs the measurement result to the control section 61. The temperature measurement result may be used for, for example, a case in which the control section 61 controls charge and discharge at the time of abnormal heat generation or a case in which the control section 61 performs correction processing at the time of calculating a remaining capacity. The voltage detection section 66 measures a voltage of the secondary battery in the electric power source 62, performs analog-to-digital conversion on the measured voltage, and supplies the resultant to the control section 61.

The switch control section 67 controls operations of the switch section 63 according to signals inputted from the current measurement section 64 and the voltage detection section 66.

The switch control section 67 executes control so that a charging current is prevented from flowing in a current path of the electric power source 62 by disconnecting the switch section 63 (charge control switch) in the case where, for example, a battery voltage reaches an overcharge detection voltage. Thereby, in the electric power source 62, only discharge is allowed to be performed through the discharging diode. It is to be noted that, for example, in the case where a large current flows at the time of charge, the switch control section 67 blocks the charging current.

Further, the switch control section 67 executes control so that a discharging current is prevented from flowing in the current path of the electric power source 62 by disconnecting the switch section 63 (discharge control switch) in the case where, for example, a battery voltage reaches an overdischarge detection voltage. Thereby, in the electric power source 62, only charge is allowed to be performed through the charging diode. It is to be noted that, for example, in the case where a large current flows at the time of discharge, the switch control section 67 blocks the discharging current.

It is to be noted that, in the secondary battery, for example, the overcharge detection voltage may be 4.20 V±0.05 V, and the over-discharge detection voltage may be 2.4 V±0.1 V.

The memory 68 may be, for example, an EEPROM as a non-volatile memory or the like. The memory 68 may hold, for example, numerical values calculated by the control section 61 and information of the secondary battery measured in a manufacturing step (such as an internal resistance in the initial state). It is to be noted that, in the case where a full charging capacity of the secondary battery is stored in the memory 68, the control section 61 is allowed to comprehend information such as a remaining capacity.

The temperature detection element 69 measures temperature of the electric power source 62, and outputs the measurement result to the control section 61. The temperature detection element 69 may be, for example, a thermistor or the like.

The cathode terminal 71 and the anode terminal 72 are terminals connected to an external device (such as a notebook personal computer) driven using the battery pack or an external device (such as a battery charger) used for charging the battery pack. The electric power source 62 is charged and discharged through the cathode terminal 71 and the anode terminal 72.

(3-2. Electric Vehicle)

Figure 7:
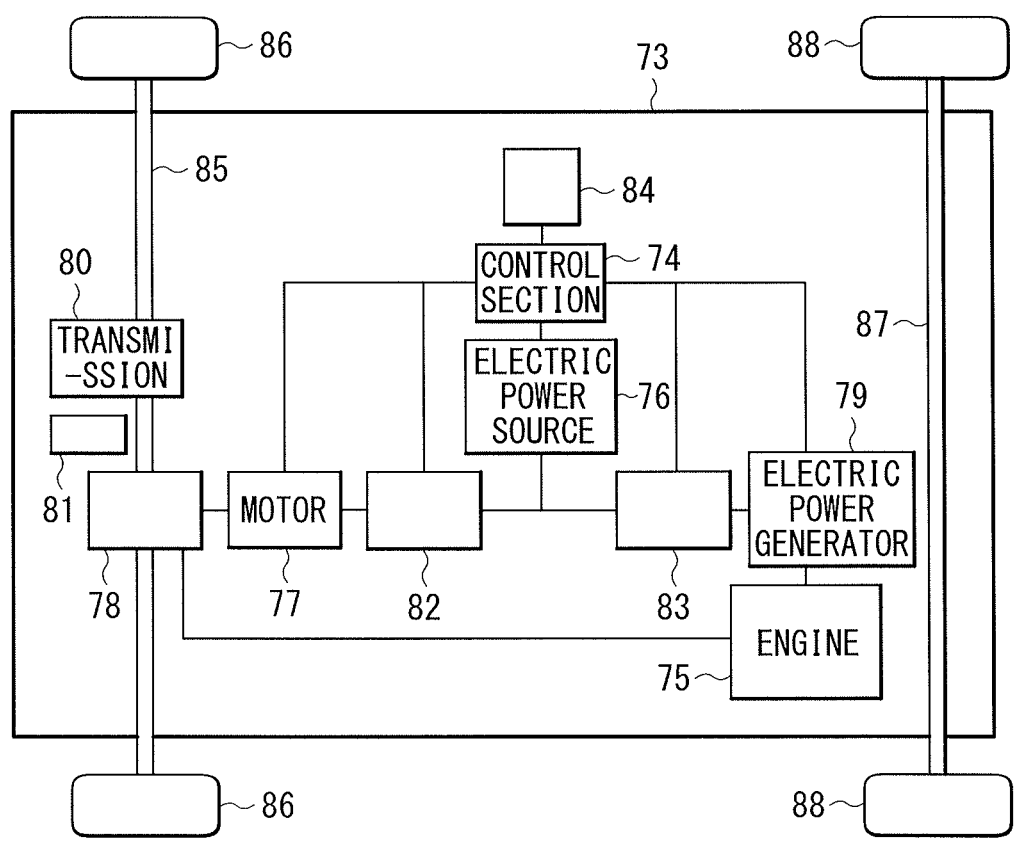
FIG. 7 is a block diagram illustrating a configuration of an application example (an electric vehicle) of the secondary battery.

FIG. 7 illustrates a block configuration of a hybrid automobile as an example of electric vehicles. For example, the electric vehicle may include a control section 74, an engine 75, an electric power source 76, a driving motor 77, a differential 78, an electric power generator 79, a transmission 80, a clutch 81, inverters 82 and 83, and various sensors 84 in a housing 73 made of metal. In addition thereto, the electric vehicle may include, for example, a front drive shaft 85 and front tires 86 that are connected to the differential 78 and the transmission 80, a rear drive shaft 87, and rear tires 88.

The electric vehicle may run with the use of, for example, one of the engine 75 and the motor 77 as a drive source. The engine 75 is a main power source, and may be, for example, a petrol engine. In the case where the engine 75 is used as a power source, drive power (torque) of the engine 75 may be transferred to the front tires 86 or the rear tires 88 through the differential 78, the transmission 80, and the clutch 81 as drive sections, for example. The torque of the engine 75 may also be transferred to the electric power generator 79. With the use of the torque, the electric power generator 79 generates alternating-current electric power. The alternating-current electric power is converted into direct-current electric power through the inverter 83, and the converted power is stored in the electric power source 76. In contrast, in the case where the motor 77 as a conversion section is used as a power source, electric power (direct-current electric power) supplied from the electric power source 76 is converted into alternating-current electric power through the inverter 82. The motor 77 is driven with the use of the alternating-current electric power. Drive power (torque) obtained by converting the electric power by the motor 77 may be transferred to the front tires 86 or the rear tires 88 through the differential 78, the transmission 80, and the clutch 81 as the drive sections, for example.

It is to be noted that, alternatively, the following mechanism may be adopted. In the mechanism, when speed of the electric vehicle is reduced by an unillustrated brake mechanism, the resistance at the time of speed reduction is transferred to the motor 77 as torque, and the motor 77 generates alternating-current electric power by the torque. It may be preferable that the alternating-current electric power be converted to direct-current electric power through the inverter 82, and the direct-current regenerative electric power be stored in the electric power source 76.

The control section 74 controls operations of the whole electric vehicle, and, for example, may include a CPU and/or the like. The electric power source 76 includes one or more secondary batteries (not illustrated). Alternatively, the electric power source 76 may be connected to an external electric power source, and electric power may be stored by receiving the electric power from the external electric power source. The various sensors 84 may be used, for example, for controlling the number of revolutions of the engine 75 or for controlling opening level (throttle opening level) of an unillustrated throttle valve. The various sensors 84 may include, for example, a speed sensor, an acceleration sensor, an engine frequency sensor, and/or the like.

The description has been given above of the hybrid automobile as an electric vehicle. However, examples of the electric vehicles may include a vehicle (electric automobile) working with the use of only the electric power source 76 and the motor 77 without using the engine 75.

(3-3. Electric Power Storage System)

Figure 8:
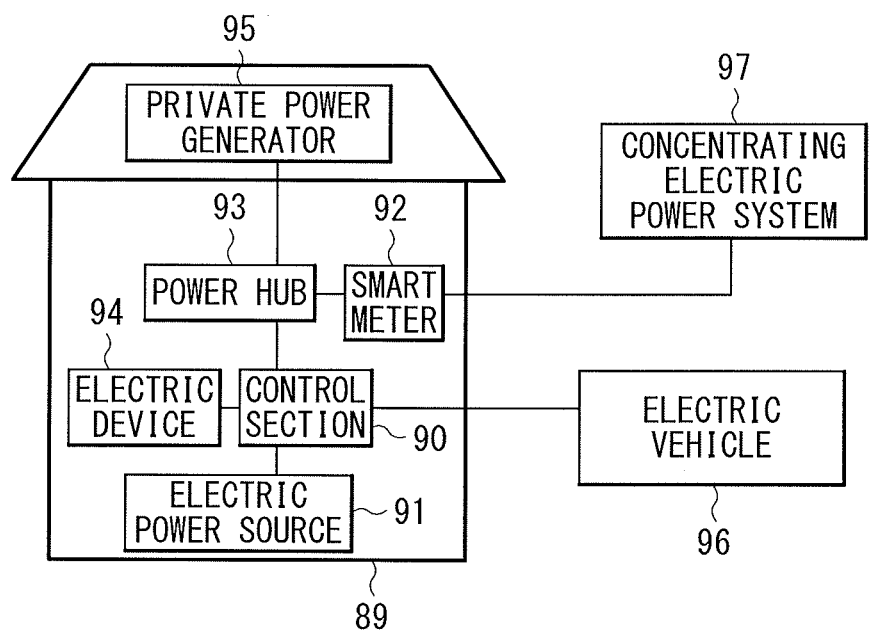
FIG. 8 is a block diagram illustrating a configuration of an application example (an electric power storage system) of the secondary battery.

FIG. 8 illustrates a block configuration of an electric power storage system. For example, the electric power storage system may include a control section 90, an electric power source 91, a smart meter 92, and a power hub 93 inside a house 89 such as a general residence and a commercial building.

In this case, the electric power source 91 may be connected to, for example, an electric device 94 disposed inside the house 89, and may be connectable to an electric vehicle 96 parked outside the house 89. Further, for example, the electric power source 91 may be connected to a private power generator 95 disposed inside the house 89 through the power hub 93, and may be connectable to an external concentrating electric power system 97 through the smart meter 92 and the power hub 93.

It is to be noted that the electric device 94 may include, for example, one or more home electric appliances such as a refrigerator, an air conditioner, a television, and a water heater. The private power generator 95 may be, for example, one or more of a solar power generator, a wind-power generator, and the like. The electric vehicle 96 may be, for example, one or more of an electric automobile, an electric motorcycle, a hybrid automobile, and the like. The concentrating electric power system 97 may be, for example, one or more of a thermal power plant, an atomic power plant, a hydraulic power plant, a wind-power plant, and the like.

The control section 90 controls operations of the whole electric power storage system (including a usage state of the electric power source 91), and, for example, may include a CPU and/or the like. The electric power source 91 includes one or more secondary batteries (not illustrated). The smart meter 92 may be, for example, an electric power meter compatible with a network disposed in the house 89 of an electric power demander, and may be communicable with an electric power supplier. Accordingly, for example, while the smart meter 92 communicates with outside, the smart meter 92 controls the balance between supply and demand in the house 89, and thereby, allows effective and stable energy supply.

In the electric power storage system, for example, electric power may be stored in the electric power source 91 from the concentrating electric power system 97 as an external electric power source through the smart meter 92 and the power hub 93, and electric power is stored in the electric power source 91 from the private power generator 95 as an independent electric power source through the power hub 93. The electric power stored in the electric power source 91 is supplied to the electric device 94 or to the electric vehicle 96 according to an instruction of the control section 90. Therefore, the electric device 94 becomes operable, and the electric vehicle 96 becomes chargeable. In other words, the electric power storage system is a system capable of storing and supplying electric power in the house 89 with the use of the electric power source 91.

The electric power stored in the electric power source 91 is arbitrarily usable. Therefore, for example, electric power is allowed to be stored in the electric power source 91 from the concentrating electric power system 97 in the middle of the night when an electric rate is inexpensive, and the electric power stored in the electric power source 91 is allowed to be used during daytime hours when an electric rate is expensive.

It is to be noted that the foregoing electric power storage system may be provided for each household (family unit), or may be provided for a plurality of households (family units).

(3-4. Electric Power Tool)

Figure 9:
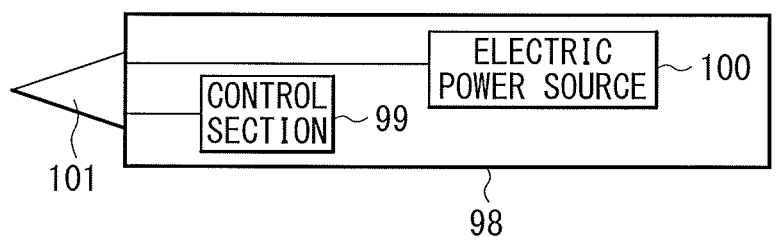
FIG. 9 is a block diagram illustrating a configuration of an application example (an electric power tool) of the secondary battery.

FIG. 9 illustrates a block configuration of an electric power tool. For example, the electric power tool may be an electric drill, and may include a control section 99 and an electric power source 100 in a tool body 98 made of a plastic material and/or the like. For example, a drill section 101 as a movable section may be attached to the tool body 98 in an operable (rotatable) manner.

The control section 99 controls operations of the whole electric power tool (including a usage state of the electric power source 100), and may include, for example, a CPU and/or the like. The electric power source 100 includes one or more secondary batteries (not illustrated). The control section 99 allows electric power to be supplied from the electric power source 100 to the drill section 101 according to operation of an unillustrated operation switch to operate the drill section 101.

EXAMPLES

Examples according to the present technology will be described in detail.

Experimental Examples 1 to 21

Formation of Cathode Active Material

First, the cathode active material was formed by the following procedure.

First, lithium salt, Manganese (II) phosphate trihydrate ($MnHPO_4.3H_2O$), and iron (II) phosphate octahydrate ($Fe_3(PO_4)_2.8H_2O$) as powder raw materials were weighed out to be 600 g in total, and the raw materials were mixed. As the lithium salt, one or more of lithium phosphate ($Li_3PO_4$), lithium carbonate ($Li_2CO_3$), and lithium metaphosphate ($Li_4P_2O_7$) were used. In this case, the mixed amounts of the respective raw materials were so adjusted as to allow a mixture ratio of Li, Mn, Fe, and P to be mole ratios (or Mn/Fe) illustrated in Table 1. Subsequently, the resultant mixture was put into 4 $dm^3$ (=4 L) of pure water, and the pure water containing the mixture was stirred to obtain slurry. Subsequently, a carbon source material was added into the slurry, and the slurry was stirred. The kind and mixed amount (carbon source amount: g) of the carbon source material are as illustrated in Table 1. Subsequently, the slurry was put into a vessel of a bead mill to be subjected to wet pulverization. In this case, a wet pulverizer, DMR/S110 manufactured by Ashizawa Finetech Ltd. and beads of zirconium oxide ($ZrO_2$) (with a beam diameter=0.05 mm) were used, and peripheral speed was 14 m/sec. and operation time was 120 minutes. Subsequently, the slurry was subjected to drying granulation by a spray drying method to obtain precursor powder. In this case, deaeration temperature was 200° C., and jetting pressure was 20 MPa. Finally, the precursor powder was fired in an inert atmosphere (100% $N_2$) to synthesize a plurality of active material particles containing the polyanion-based compound. Thus, the cathode active material with a structure in which the plurality of active material particles and the carbon material (the coating carbon material and the free carbon material) were composited was obtained. In this firing process, firing temperature was 600° C., firing time was 180 hours, and rising temperature was 15° C./min. The composition of the polyanion-based compound and physical properties (the ratio B/A and the ratio D/C) of the cathode active material are as illustrated in Table 2.

[Fabrication of Secondary Battery]

The cylindrical-type secondary battery illustrated in FIG. 2 and FIG. 3 was fabricated by the following procedure.

The cathode 21 was fabricated as follows. First, 91 parts by mass of the foregoing cathode active material, 3 parts by mass of a cathode binder (polyvinylidene fluoride), and 6 parts by mass of a cathode electric conductor (graphite) were mixed to obtain a cathode mixture. Subsequently, the cathode mixture was dispersed in an organic solvent (NMP) to obtain paste cathode mixture slurry. Subsequently, both surfaces of the strip-shaped cathode current collector 21A (an aluminum foil having a thickness of 20 μm) were coated with the cathode mixture slurry uniformly with use of a coating apparatus, which was dried to form the cathode active material layer 21B. Finally, the cathode active material layer 21B was compression-molded with the use of a roll pressing machine.

The anode 22 was fabricated as follows. First, 90 parts by mass of an anode active material (artificial graphite) and 10 parts by mass of an anode binder (polyvinylidene fluoride) were mixed to obtain an anode mixture. Subsequently, the anode mixture was dispersed in an organic solvent (NMP) to obtain paste anode mixture slurry. Subsequently, both surfaces of the strip-shaped anode current collector 22A (an electrolytic copper foil having a thickness of 15 μm) were coated with the anode mixture slurry uniformly with use of a coating apparatus, which was dried to form the anode active material layer 22B. Finally, the anode active material layer 22B was compression-molded with the use of a roll pressing machine.

Subsequently, electrolyte salt ($LiPF_6$) was dissolved in a solvent (ethylene carbonate and diethyl carbonate) to prepare an electrolytic solution. In this case, the composition of the solvent was ethylene carbonate:diethyl carbonate=50:50 in weight ratio, and the content of the electrolyte salt in the solvent was 1 mol/kg.

The secondary battery was assembled as follows. First, the cathode lead 25 made of aluminum was attached to the cathode current collector 21A by welding, and the anode lead 26 made of nickel was attached to the anode current collector 22A by welding. Subsequently, the cathode 21 and the anode 22 were layered with the separator 23 (a microporous polypropylene film having a thickness of 25 μm) in between, and were spirally wound. Thereafter, a winding end portion of the resultant spirally wound body was fixed with use of an adhesive tape to fabricate the spirally wound electrode body 20. Subsequently, the center pin 24 was inserted in the center of the spirally wound electrode body 20. Subsequently, the spirally wound electrode body 20 was sandwiched between the pair of insulating plates 12 and 13, and was contained in the battery can 11 made of nickel-plated iron. In this case, the end tip of the cathode lead 25 was attached to the safety valve mechanism 15 by welding, and the end tip of the anode lead 26 was attached to the battery can 11 by welding. Subsequently, the electrolytic solution was injected into the battery can 11 by a decompression method, and the separator 23 was impregnated with the electrolytic solution. Finally, at the open end of the battery can 11, the battery cover 14, the safety valve mechanism 15, and the PTC element 16 were fixed by being caulked with the gasket 17. Thus, the cylindrical-type secondary battery was completed. It is to be noted that, when the secondary battery was fabricated, the thickness of the cathode active material layer 21B was adjusted to prevent lithium metal from being precipitated on the anode 22 in a fully-charged state.

[Measurement of Battery Characteristics]

When cycle characteristics and rate characteristics were examined as battery characteristics of the secondary battery, results illustrated in Table 2 were obtained.

Upon examining the cycle characteristics, one cycle of charge and discharge was performed on the secondary battery in the ambient temperature environment (23° C.) to stabilize a battery state of the secondary battery, and thereafter, one cycle of charge and discharge was further performed on the secondary battery in the same environment to measure a discharging capacity. Subsequently, the secondary battery was repeatedly charged and discharged until the total number of cycles reached 300 cycles in the same environment to measure a discharging capacity. A cycle retention ratio (%)=(discharging capacity at the 300th cycle/discharging capacity at the second cycle)×100 was calculated from the measurement results thereof. At the time of charge, charge was performed at a constant current of 1 C until an upper-limit voltage reached 4.2 V, and charge was further performed at a constant voltage of 4.2 V until the current reached 0.05 C. At the time of discharge, discharge was performed at a constant current of 1 C until the voltage reached a start-to-end voltage of 2.5 V. The "1 C" refers to a current value at which the battery capacity (theoretical capacity) is completely discharged in 1 hour, and the "0.05 C" refers to a current value at which the battery capacity (theoretical capacity) is completely discharged in 20 hours.

Upon examining the rate characteristics, the secondary battery of which the battery state was stabilized by a procedure similar to that when the cycle characteristics were examined was used. One cycle of charge and discharge was performed on the secondary battery in the ambient temperature environment (23° C.) to measure a discharging capacity, and thereafter one cycle of charge and discharge was further performed in the same environment to measure a discharging capacity. A rate retention ratio (%)=(discharging capacity at the third cycle/discharging capacity at the second cycle)×100 was calculated from the measurement results thereof. At the time of charge at the second cycle and the third cycle, charge was performed at a constant current of 0.2 C until an upper-limit voltage reached 4.2 V, and charge was further performed at a constant voltage of 4.2 V until the current reached 0.05 C. At the time of discharge at the second cycle, discharge was performed at a constant current of 0.2 C until the voltage reached a cutoff voltage of 2.5 V, and at the time of discharge at the third cycle, discharge was performed at a constant current of 3 C until the voltage reached the cutoff voltage of 2.5 V. The "0.2 C" refers to a current value at which the battery capacity (theoretical capacity) is completely discharged in 5 hours, and the "3 C" refers to a current value at which the battery capacity (theoretical capacity) is completely discharged in 1/3 hours.

TABLE 1

| Experimental Example | Carbon Source Mn/Fe | Carbon Source Material | Carbon Source Amount (g) | Mixture Ratio (mole ratio) | | |
|---|---|---|---|---|---|---|
| | | | | $Li_2CO_3$ | $Li_4P_2O_7$ | $Li_3PO_4$ |
| 1 | 70/30 | Maltose | 90 | 0 | 0 | 4 |
| 2 | | | 150 | 1 | 1 | 2 |

TABLE 1-continued

| Experimental Example | Carbon Source Mn/Fe | Carbon Source Material | Carbon Source Amount (g) | Mixture Ratio (mole ratio) | | |
|---|---|---|---|---|---|---|
| | | | | $Li_2CO_3$ | $Li_4P_2O_7$ | $Li_3PO_4$ |
| 3 | | | 120 | 1 | 1 | 2 |
| 4 | | | 90 | 2 | 2 | 0 |
| 5 | | | 90 | 1 | 1 | 2 |
| 6 | | | 60 | 2 | 2 | 0 |
| 7 | | | 75 | 2 | 2 | 0 |
| 8 | | | 45 | 2 | 2 | 0 |
| 9 | | | 60 | 1 | 1 | 2 |
| 10 | 50/50 | | 75 | 1 | 1 | 2 |
| 11 | 60/40 | | 75 | 1 | 1 | 2 |
| 12 | 80/20 | | 135 | 1 | 1 | 2 |
| 13 | 90/10 | | 135 | 1 | 1 | 2 |
| 14 | 50/50 | | 135 | 1 | 1 | 2 |
| 15 | 60/40 | | 135 | 1 | 1 | 2 |
| 16 | 80/20 | | 75 | 1 | 1 | 2 |
| 17 | 90/10 | | 75 | 1 | 1 | 2 |
| 18 | 70/30 | PVA | 75 | 1 | 2 | 2 |
| 19 | | | 60 | 1 | 2 | 2 |
| 20 | | | 52.5 | 1 | 2 | 2 |
| 21 | | | 45 | 1 | 2 | 2 |

TABLE 2

| Experimental Example | Polyanion-based Compound | Ratio B/A | Ratio D/C | Cycle Retention Ratio (%) | Rate Retention Ratio (%) |
|---|---|---|---|---|---|
| 1 | $LiMn_{0.7}Fe_{0.3}PO_4$ | 6.1 | 2.5 | 60 | 93 |
| 2 | | 6.2 | 1.3 | 75 | 79 |
| 3 | | 7.5 | 1.65 | 88 | 87 |
| 4 | | 8.1 | 1.4 | 85 | 76 |
| 5 | | 8.4 | 2.1 | 76 | 87 |
| 6 | | 9.2 | 1.68 | 90 | 85 |
| 7 | | 11.2 | 1.84 | 92 | 84 |
| 8 | | 12 | 1.9 | 92 | 79 |
| 9 | | 12 | 2.6 | 60 | 82 |
| 10 | $LiMn_{0.5}Fe_{0.5}PO_4$ | 8.1 | 1.9 | 82 | 90 |
| 11 | $LiMn_{0.6}Fe_{0.4}PO_4$ | 7.2 | 1.8 | 81 | 82 |
| 12 | $LiMn_{0.8}Fe_{0.2}PO_4$ | 7.3 | 1.85 | 80 | 83 |
| 13 | $LiMn_{0.9}Fe_{0.1}PO_4$ | 7.2 | 1.8 | 81 | 81 |
| 14 | $LiMn_{0.5}Fe_{0.5}PO_4$ | 6.8 | 1.7 | 83 | 77 |
| 15 | $LiMn_{0.6}Fe_{0.4}PO_4$ | 6.2 | 1.65 | 81 | 75 |
| 16 | $LiMn_{0.8}Fe_{0.2}PO_4$ | 9.2 | 2.2 | 74 | 83 |
| 17 | $LiMn_{0.9}Fe_{0.1}PO_4$ | 8.3 | 2.1 | 74 | 81 |
| 18 | $LiMn_{0.7}Fe_{0.3}PO_4$ | 6.5 | 1.75 | 70 | 82 |
| 19 | | 7.1 | 2 | 86 | 91 |
| 20 | | 7.5 | 2.2 | 70 | 87 |
| 21 | | 9.2 | 2.5 | 65 | 87 |

The cycle retention ratio and the rate retention ratio were greatly changed according to the ratio B/A and the ratio D/C. In this case, when the ratio B/A satisfied 7<B/A<11.5 and the ratio D/C satisfied 1.5<D/C≤2, compared to a case where both the conditions were not satisfied, both the cycle retention ratio and the rate retention ratio were 80% or more.

This result indicates that when the ratio B/A and the ratio D/C satisfy the foregoing respective conditions, the coating amount of the carbon material and the affinity of the cathode active material for the electrolytic solution are made appropriate. Therefore, the metal component is less likely to be eluted from the cathode active material to the electrolytic solution even at the time of charge at a high voltage, and the charge transfer resistance of the cathode active material is less likely to be increased, and accordingly, superior cycle characteristics and superior rate characteristics are obtained.

From the results in Table 1 and Table 2, when the active material included a plurality of active material particles (the polyanion-based compound) as primary particles and the carbon material (the coating carbon material and the free carbon material), and the ratio B/A and the ratio D/C satisfied the foregoing respective conditions, superior battery characteristics were obtained.

The present technology has been described with reference to some embodiments and the examples. However, the present technology is not limited to the examples described in the embodiments and the examples, and various modifications may be made. For example, the description has been given with the specific examples of the case in which the battery structure is the cylindrical type or the laminated film type, and the battery device has the spirally wound structure. However, applicable structures are not limited thereto. The secondary battery of the present technology is similarly applicable to a battery having other battery structure such as a square-type battery, a coin-type battery, and a button-type battery, or a battery in which the battery device has other structure such as a laminated structure.

Moreover, the secondary battery-use active material and the secondary battery-use electrode of the present technology may be applied not only to a secondary battery, but also to other electrochemical devices. Examples of other electrochemical devices may include a capacitor.

Further, description has been given of appropriate ranges derived from the results of the examples for the ranges of the ratio B/A and the ratio D/C. However, the description does not totally deny a possibility that the ratio B/C and the ratio D/C become out of the foregoing ranges. That is, the foregoing appropriate ranges are particularly preferable ranges to obtain the effect of the present technology. Therefore, as long as the effect of the present technology is obtainable, the ratio B/A and the ratio D/C may be out of the foregoing ranges in some degree.

It is possible to achieve at least the following configurations from the above-described example embodiments and the modifications of the technology.

(1) A secondary battery including:
a cathode including an active material;
an anode; and
an electrolytic solution, in which
the active material includes a plurality of active material particles as primary particles and a carbon material,
the active material particles contain a polyanion-based compound represented by the following formula (1),
the carbon material contains a first carbon material and a second carbon material, the first carbon material being present on surfaces of the active material particles, and the second carbon material being present between the active material particles provided with the first carbon material,
a ratio B/A satisfies 7<B/A<11.5, where A is a total carbon amount of the active material measured by a total organic carbon analysis method (TOC), and B is a surface carbon amount of the active material measured by an X-ray photoelectron spectroscopy (XPS), and
a ratio D/C satisfies 1.5<D/C≤2, where C is a specific surface area of the active material measured by a BET single-point method, and D is an oil feed amount of N-methyl-2-pyrrolidone (NMP) with respect to the active material measured by an oil feed amount measurement method (JIS K5101-13-1), $$Li_aM_bXO_cY_d \tag{1}$$

where M is one or more of transition metal elements, X is one or more of phosphorus (P), arsenic (As), silicon (Si), sulfur (S), vanadium (V), molybdenum (Mo), and tungsten (W), and Y is one or more of halogen elements, and a to d satisfy 0<a≤2, 0<b≤1, 0<c≤4, and 0≤d≤1.

(2) The secondary battery according to (1), in which the M is one or more of iron (Fe), cobalt (Co), manganese (Mn), and nickel (Ni),
the X is one or both of silicon (Si) and phosphorus (P), and
the Y is one or more of fluorine (F), chlorine (Cl), bromine (Br), and iodine (I).

(3) The secondary battery according to (1) or (2), in which the X is P.

(4) The secondary battery according to any one of (1) to (3), in which the polyanion-based compound is represented by the following formula (2), $$LiMn_eZ_{1-e}PO_4 \tag{2}$$

where Z is one or more of Fe, Co, and Ni, and e satisfies 0<e≤1.

(5) The secondary battery according to (4), in which the Z is Fe.

(6) The secondary battery according to (5), in which the e satisfies 0.5≤e≤0.9.

(7) The secondary battery according to any one of (1) to (6), in which an upper limit of a charging voltage is from 3.9 V to 4.4 V both inclusive.

(8) The secondary battery according to any one of (1) to (7), in which the secondary battery is a lithium secondary battery.

(9) A secondary battery-use electrode including an active material, in which
the active material includes a plurality of active material particles as primary particles and a carbon material,
the active material particles contain a polyanion-based compound represented by the following formula (1),
the carbon material contains a first carbon material and a second carbon material, the first carbon material being present on surfaces of the active material particles, and the second carbon material being present between the active material particles provided with the first carbon material,
a ratio B/A satisfies 7<B/A<11.5, where A is a total carbon amount of the active material measured by a total organic carbon analysis method (TOC), and B is a surface carbon amount of the active material measured by an X-ray photoelectron spectroscopy (XPS), and
a ratio D/C satisfies 1.5<D/C≤2, where C is a specific surface area of the active material measured by a BET single-point method, and D is an oil feed amount of N-methyl-2-pyrrolidone (NMP) with respect to the active material measured by an oil feed amount measurement method (JIS K5101-13-1), $$Li_aM_bXO_cY_d \tag{1}$$

where M is one or more of transition metal elements, X is one or more of phosphorus (P), arsenic (As), silicon (Si), sulfur (S), vanadium (V), molybdenum (Mo), and tungsten (W), and Y is one or more of halogen elements, and a to d satisfy 0<a≤2, 0<b≤1, 0<c≤4, and 0≤d≤1.

(10) A secondary battery-use active material including:
a plurality of active material particles as primary particles; and
a carbon material,
in which the active material particles contain a polyanion-based compound represented by the following formula (1),
the carbon material contains a first carbon material and a second carbon material, the first carbon material being present on surfaces of the active material particles, and the second carbon material being present between the active material particles provided with the first carbon material, a ratio B/A satisfies 7<B/A<11.5, where A is a total carbon amount of the active material measured by a total organic carbon analysis method (TOC), and B is a surface carbon amount of the active material measured by an X-ray photoelectron spectroscopy (XPS), and a ratio D/C satisfies 1.5<D/C≤2, where C is a specific surface area of the active material measured by a BET single-point method, and D is an oil feed amount of N-methyl-2-pyrrolidone (NMP) with respect to the active material measured by an oil feed amount measurement method (JIS K5101-13-1), $$Li_aM_bXO_cY_d \tag{1}$$

where M is one or more of transition metal elements, X is one or more of phosphorus (P), arsenic (As), silicon (Si), sulfur (S), vanadium (V), molybdenum (Mo), and tungsten (W), and Y is one or more of halogen elements, and a to d satisfy 0<a≤2, 0<b≤1, 0<c≤4, and 0≤d≤1.

(11) A battery pack comprising:
the secondary battery according to any one of (1) to (8);
a control section configured to control a usage state of the secondary battery; and
a switch section configured to switch the usage state of the secondary battery according to an instruction of the control section.

(12) An electric vehicle including:
the secondary battery according to any one of (1) to (8);
a conversion section configured to convert electric power supplied from the secondary battery into drive power;
a drive section configured to operate according to the drive power; and
a control section configured to control a usage state of the secondary battery.

(13) An electric power storage system including:
the secondary battery according to any one of (1) to (8);
one or more electric devices configured to be supplied with electric power from the secondary battery; and
a control section configured to control the supplying of the electric power from the secondary battery to the one or more electric devices.

(14) An electric power tool including:
the secondary battery according to any one of (1) to (8); and
a movable section configured to be supplied with electric power from the secondary battery.

(15) An electronic apparatus including the secondary battery according to any one of (1) to (8) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A secondary battery comprising:
a cathode including an active material;
an anode; and
an electrolytic solution, wherein
the active material includes a plurality of active material particles as primary particles and a carbon material,
the active material particles contain a polyanion-based compound represented by the following formula (1),
the carbon material contains a first carbon material and a second carbon material, the first carbon material being present on surfaces of the active material particles, and the second carbon material being present between the active material particles provided with the first carbon material, a ratio B/A satisfies 7<B/A<11.5, where A is a total carbon amount of the active material measured by a total organic carbon analysis method (TOC), and B is a surface carbon amount of the active material measured by an X-ray photoelectron spectroscopy (XPS), and a ratio D/C satisfies 1.5<D/C≤2, where C is a specific surface area of the active material measured by a BET single-point method, and D is an oil feed amount of N-methyl-2-pyrrolidone (NMP) with respect to the active material measured by an oil feed amount measurement method (JIS K5101-13-1), $$Li_aM_bXO_cY_d \tag{1}$$

where M is one or more of transition metal elements, X is one or more of phosphorus (P), arsenic (As), silicon (Si), sulfur (S), vanadium (V), molybdenum (Mo), and tungsten (W), and Y is one or more of halogen elements, and a to d satisfy 0<a≤2, 0<b≤1, 0<c≤4, and 0≤d≤1.

2. The secondary battery according to claim 1, wherein the M is one or more of iron (Fe), cobalt (Co), manganese (Mn), and nickel (Ni),
the X is one or both of silicon (Si) and phosphorus (P), and
the Y is one or more of fluorine (F), chlorine (Cl), bromine (Br), and iodine (I).

3. The secondary battery according to claim 1, wherein the X is P.

4. The secondary battery according to claim 1, wherein the polyanion-based compound is represented by the following formula (2), $$LiMn_eZ_{1-e}PO_4 \tag{2}$$

where Z is one or more of Fe, Co, and Ni, and e satisfies 0<e≤1.

5. The secondary battery according to claim 4, wherein the Z is Fe.

6. The secondary battery according to claim 5, wherein the e satisfies 0.5≤e≤0.9.

7. The secondary battery according to claim 1, wherein an upper limit of a charging voltage is from 3.9 V to 4.4 V both inclusive.

8. The secondary battery according to claim 1, wherein the secondary battery is a lithium secondary battery.

9. A secondary battery-use electrode comprising an active material, wherein
the active material includes a plurality of active material particles as primary particles and a carbon material,
the active material particles contain a polyanion-based compound represented by the following formula (1),
the carbon material contains a first carbon material and a second carbon material, the first carbon material being present on surfaces of the active material particles, and the second carbon material being present between the active material particles provided with the first carbon material, a ratio B/A satisfies 7<B/A<11.5, where A is a total carbon amount of the active material measured by a total organic carbon analysis method (TOC), and B is a surface carbon amount of the active material measured by an X-ray photoelectron spectroscopy (XPS), and a ratio D/C satisfies 1.5<D/C≤2, where C is a specific surface area of the active material measured by a BET single-point method, and D is an oil feed amount of N-methyl-2-pyrrolidone (NMP) with respect to the active material measured by an oil feed amount measurement method (JIS K5101-13-1), $$Li_aM_bCO_cY_d \qquad (1)$$

where M is one or more of transition metal elements, X is one or more of phosphorus (P), arsenic (As), silicon (Si), sulfur (S), vanadium (V), molybdenum (Mo), and tungsten (W), and Y is one or more of halogen elements, and a to d satisfy 0<a≤2, 0<b≤1, 0<c≤4, and 0≤d≤1.

10. A secondary battery-use active material comprising:
a plurality of active material particles as primary particles; and
a carbon material,
wherein the active material particles contain a polyanion-based compound represented by the following formula (1),
the carbon material contains a first carbon material and a second carbon material, the first carbon material being present on surfaces of the active material particles, and the second carbon material being present between the active material particles provided with the first carbon material,
a ratio B/A satisfies 7<B/A<11.5, where A is a total carbon amount of the active material measured by a total organic carbon analysis method (TOC), and B is a surface carbon amount of the active material measured by an X-ray photoelectron spectroscopy (XPS), and
a ratio D/C satisfies 1.5<D/C≤2, where C is a specific surface area of the active material measured by a BET single-point method, and D is an oil feed amount of N-methyl-2-pyrrolidone (NMP) with respect to the active material measured by an oil feed amount measurement method (JIS K5101-13-1), $$Li_aM_bXO_cY_d \qquad (1)$$

where M is one or more of transition metal elements, X is one or more of phosphorus (P), arsenic (As), silicon (Si), sulfur (S), vanadium (V), molybdenum (Mo), and tungsten (W), and Y is one or more of halogen elements, and a to d satisfy 0<a≤2, 0<b≤1, 0<c≤4, and 0≤d≤1.

11. A battery pack comprising:
a secondary battery;
a control section configured to control a usage state of the secondary battery; and
a switch section configured to switch the usage state of the secondary battery according to an instruction of the control section, wherein
the secondary battery includes a cathode including an active material, an anode, and an electrolytic solution,
the active material includes a plurality of active material particles as primary particles and a carbon material,
the active material particles contain a polyanion-based compound represented by the following formula (1),
the carbon material contains a first carbon material and a second carbon material, the first carbon material being present on surfaces of the active material particles, and the second carbon material being present between the active material particles provided with the first carbon material,
a ratio B/A satisfies 7<B/A<11.5, where A is a total carbon amount of the active material measured by a total organic carbon analysis method (TOC), and B is a surface carbon amount of the active material measured by an X-ray photoelectron spectroscopy (XPS), and
a ratio D/C satisfies 1.5<D/C≤2, where C is a specific surface area of the active material measured by a BET single-point method, and D is an oil feed amount of N-methyl-2-pyrrolidone (NMP) with respect to the active material measured by an oil feed amount measurement method (JIS K5101-13-1), $$Li_aM_bXO_cY_d \qquad (1)$$

where M is one or more of transition metal elements, X is one or more of phosphorus (P), arsenic (As), silicon (Si), sulfur (S), vanadium (V), molybdenum (Mo), and tungsten (W), and Y is one or more of halogen elements, and a to d satisfy 0<a≤2, 0<b≤1, 0<c≤4, and 0≤d≤1.

12. An electric vehicle comprising:
a secondary battery;
a conversion section configured to convert electric power supplied from the secondary battery into drive power;
a drive section configured to operate according to the drive power; and
a control section configured to control an usage state of the secondary battery, wherein
the secondary battery includes a cathode including an active material, an anode, and an electrolytic solution,
the active material includes a plurality of active material particles as primary particles and a carbon material,
the active material particles contain a polyanion-based compound represented by the following formula (1),
the carbon material contains a first carbon material and a second carbon material, the first carbon material being present on surfaces of the active material particles, and the second carbon material being present between the active material particles provided with the first carbon material,
a ratio B/A satisfies 7<B/A<11.5, where A is a total carbon amount of the active material measured by a total organic carbon analysis method (TOC), and B is a surface carbon amount of the active material measured by an X-ray photoelectron spectroscopy (XPS), and
a ratio D/C satisfies 1.5<D/C≤2, where C is a specific surface area of the active material measured by a BET single-point method, and D is an oil feed amount of N-methyl-2-pyrrolidone (NMP) with respect to the active material measured by an oil feed amount measurement method (JIS K5101-13-1), $$Li_aM_bXO_cY_d \qquad (1)$$

where M is one or more of transition metal elements, X is one or more of phosphorus (P), arsenic (As), silicon (Si), sulfur (S), vanadium (V), molybdenum (Mo), and tungsten (W), and Y is one or more of halogen elements, and a to d satisfy 0<a≤2, 0<b≤1, 0<c≤4, and 0≤d≤1.

13. An electric power storage system comprising:
a secondary battery;
one or more electric devices configured to be supplied with electric power from the secondary battery; and
a control section configured to control the supplying of the electric power from the secondary battery to the one or more electric devices, wherein
the secondary battery includes a cathode including an active material, an anode, and an electrolytic solution,
the active material includes a plurality of active material particles as primary particles and a carbon material, the active material particles contain a polyanion-based compound represented by the following formula (1), the carbon material contains a first carbon material and a second carbon material, the first carbon material being present on surfaces of the active material particles, and the second carbon material being present between the active material particles provided with the first carbon material, a ratio B/A satisfies 7<B/A<11.5, where A is a total carbon amount of the active material measured by a total organic carbon analysis method (TOC), and B is a surface carbon amount of the active material measured by an X-ray photoelectron spectroscopy (XPS), and a ratio D/C satisfies 1.5<D/C≤2, where C is a specific surface area of the active material measured by a BET single-point method, and D is an oil feed amount of N-methyl-2-pyrrolidone (NMP) with respect to the active material measured by an oil feed amount measurement method (JIS K5101-13-1), $$Li_aM_bXO_cY_d \qquad (1)$$

where M is one or more of transition metal elements, X is one or more of phosphorus (P), arsenic (As), silicon (Si), sulfur (S), vanadium (V), molybdenum (Mo), and tungsten (W), and Y is one or more of halogen elements, and a to d satisfy 0<a≤2, 0<b≤1, 0<c≤4, and 0≤d≤1.

14. An electric power tool comprising:

a secondary battery; and a movable section configured to be supplied with electric power from the secondary battery, wherein the secondary battery includes a cathode including an active material, an anode, and an electrolytic solution, the active material includes a plurality of active material particles as primary particles and a carbon material, the active material particles contain a polyanion-based compound represented by the following formula (1), the carbon material contains a first carbon material and a second carbon material, the first carbon material being present on surfaces of the active material particles, and the second carbon material being present between the active material particles provided with the first carbon material, a ratio B/A satisfies 7<B/A<11.5, where A is a total carbon amount of the active material measured by a total organic carbon analysis method (TOC), and B is a surface carbon amount of the active material measured by an X-ray photoelectron spectroscopy (XPS), and a ratio D/C satisfies 1.5<D/C≤2, where C is a specific surface area of the active material measured by a BET single-point method, and D is an oil feed amount of N-methyl-2-pyrrolidone (NMP) with respect to the active material measured by an oil feed amount measurement method (JIS K5101-13-1), $$Li_aM_bXO_cY_d \qquad (1)$$

where M is one or more of transition metal elements, X is one or more of phosphorus (P), arsenic (As), silicon (Si), sulfur (S), vanadium (V), molybdenum (Mo), and tungsten (W), and Y is one or more of halogen elements, and a to d satisfy 0<a≤2, 0<b≤1, 0<c≤4, and 0≤d≤1.

15. An electronic apparatus comprising an secondary battery as an electric power supply source, wherein the secondary battery includes a cathode including an active material, an anode, and an electrolytic solution, the active material includes a plurality of active material particles as primary particles and a carbon material, the active material particles contain a polyanion-based compound represented by the following formula (1), the carbon material contains a first carbon material and a second carbon material, the first carbon material being present on surfaces of the active material particles, and the second carbon material being present between the active material particles provided with the first carbon material, a ratio B/A satisfies 7<B/A<11.5, where A is a total carbon amount of the active material measured by a total organic carbon analysis method (TOC), and B is a surface carbon amount of the active material measured by an X-ray photoelectron spectroscopy (XPS), and a ratio D/C satisfies 1.5<D/C≤2, where C is a specific surface area of the active material measured by a BET single-point method, and D is an oil feed amount of N-methyl-2-pyrrolidone (NMP) with respect to the active material measured by an oil feed amount measurement method (JIS K5101-13-1), $$Li_aM_bXO_cY_d \qquad (1)$$

where M is one or more of transition metal elements, X is one or more of phosphorus (P), arsenic (As), silicon (Si), sulfur (S), vanadium (V), molybdenum (Mo), and tungsten (W), and Y is one or more of halogen elements, and a to d satisfy 0<a≤2, 0<b≤1, 0<c≤4, and 0≤d≤1.

* * * * *